(12) United States Patent
Hino et al.

(10) Patent No.: US 10,355,547 B2
(45) Date of Patent: Jul. 16, 2019

(54) ROTARY ELECTRIC MACHINE

(71) Applicant: Mitsubishi Electric Corporation, Tokyo (JP)

(72) Inventors: Tatsuro Hino, Tokyo (JP); Masashi Nakamura, Tokyo (JP); Kohei Egashira, Tokyo (JP)

(73) Assignee: Mistubishi Electric Corporation, Chiyoda-ku, Tokyo (JP)

( * ) Notice: Subject to any disclaimer, the term of this patent is extended or adjusted under 35 U.S.C. 154(b) by 87 days.

(21) Appl. No.: 15/784,292

(22) Filed: Oct. 16, 2017

(65) Prior Publication Data

US 2018/0342918 A1 Nov. 29, 2018

(30) Foreign Application Priority Data

May 23, 2017 (JP) .................................. 2017-101787

(51) Int. Cl.
| | |
|---|---|
| *H02K 3/04* | (2006.01) |
| *H02K 3/12* | (2006.01) |
| *H02K 3/50* | (2006.01) |
| *H02K 1/16* | (2006.01) |
| *H02K 3/48* | (2006.01) |
| *H02K 3/28* | (2006.01) |
| *H02K 15/00* | (2006.01) |

(Continued)

(52) U.S. Cl.
CPC ............... *H02K 3/12* (2013.01); *H02K 1/165* (2013.01); *H02K 3/28* (2013.01); *H02K 3/48* (2013.01); *H02K 3/50* (2013.01); *H02K 3/505* (2013.01); *H02K 3/521* (2013.01); *H02K 15/0081* (2013.01); *H02K 1/276* (2013.01); *H02K 29/03* (2013.01); *H02K 2211/03* (2013.01)

(58) Field of Classification Search
CPC .. H02K 3/12; H02K 3/28; H02K 3/48; H02K 3/50; H02K 3/505; H02K 3/521; H02K 1/165; H02K 1/276; H02K 15/0081; H02K 2211/03

See application file for complete search history.

(56) References Cited

U.S. PATENT DOCUMENTS

| | | | | |
|---|---|---|---|---|
| 2,414,571 A | * | 1/1947 | Veinott .................... | H02K 3/28 310/169 |
| 6,462,453 B1 | * | 10/2002 | Asao ....................... | H02K 3/12 310/179 |

(Continued)

FOREIGN PATENT DOCUMENTS

| | | |
|---|---|---|
| JP | 2012-249344 A | 12/2012 |
| JP | 5471867 B2 | 4/2014 |

*Primary Examiner* — Thanh Lam
(74) *Attorney, Agent, or Firm* — Sughrue Mion, PLLC; Richard C. Turner

(57) ABSTRACT

Phase windings are configured radially inside first coil ends by connecting together tip portions of first terminals that are bent so as to extend outward from slots that are six slots apart, and radially outside the first coil ends by connecting together tip portions of second terminals that are bent so as to extend outward from slots that are five slots apart, and also connecting together tip portions of second terminals that are bent so as to extend outward from slots that are seven slots apart in modified positions of an inserted slot group, and by connecting together tip portions of second terminals that are bent so as to extend outward from slots that are six slots apart in regions other than the modified positions of the inserted slot group.

6 Claims, 15 Drawing Sheets

(51) Int. Cl.
*H02K 3/52* (2006.01)
*H02K 29/03* (2006.01)
*H02K 1/27* (2006.01)

(56) References Cited

U.S. PATENT DOCUMENTS

2012/0248923 A1* 10/2012 Kimura .................... H02K 3/28
310/198
2015/0200575 A1* 7/2015 Tsuiki ...................... H02K 3/28
310/203
2016/0156238 A1* 6/2016 Tsuiki ...................... H02K 3/12
310/71

* cited by examiner

US 10,355,547 B2

ROTARY ELECTRIC MACHINE

BACKGROUND OF THE INVENTION

1. Field of the Invention

The present invention relates to a rotary electric machine such as an electric motor, or a generator, for example, and particularly relates to a stator winding construction.

2. Description of the Related Art

In recent years, compactness and high productivity have been required in rotary electric machines such as electric motors or generators.

In conventional rotary electric machines such as that described in Patent Literature 1, conducting wires have: first slot-accommodated portions that are accommodated in slots; second slot-accommodated portions, third slot-accommodated portions, etc., through nth slot-accommodated portions, that are accommodated in respective slots that are spaced apart circumferentially sequentially from the first slot-accommodated portions; and (n−1)th return portions that connect the (n−1)th slot-accommodated portions and the nth slot-accommodated portions, and the first slot-accommodated portions of a stator winding are disposed on radially outermost sides of the slots, and the nth slot-accommodated portions thereof are disposed on radially innermost sides of the slots, and respective phase windings that constitute the stator winding include at least two (first and second) conducting wires, and outer circumferential end portions that are connected to the first slot-accommodated portions of the first conducting wire and inner circumferential end portions that are connected to the nth slot-accommodated portions of the second conducting wire are connected. In a conventional rotary electric machine that is described in Patent Literature 1, inner circumferential end portions are led out to a radially outer side so as to pass axially outside a coil end group, and are connected directly to outer circumferential end portions that are intended for connection therewith. Thus, because welded positions are reduced in number, and the lengths of individual conducting wires are also shorter, handling during manufacturing is facilitated, improving productivity.

In conventional rotary electric machines such as that described in Patent Literature 2, a plurality of distributed lap-wound winding bodies are included that are each configured by winding a conductor wire a plurality of times so as to pass through pairs of (first and second) slots that are positioned on two circumferential sides of a plurality of teeth, such that two ends of the conductor wires are made to protrude from a radially outermost position in a radial direction in a first slot of the pair of slots and a central position in the radial direction in a second slot of the pair of slots, and respective phase windings that constitute the stator winding have at least two (first and second) winding bodies, and end portions of first winding bodies that protrude outward from the central position in the slots are led out radially outward so as to pass between coil ends, and are connected to end portions of second winding bodies that protrude outward from a radially outermost position in the slots on a radially outer side of the coil end group using busbars. In conventional rotary electric machines such as that described in Patent Literature 2, because the end portions that protrude outward from the central positions in the slots of the first winding bodies are led radially outward so as to pass between the coil ends, increases in axial length of the stator winding are suppressed.

CITATION LIST

Patent Literature

Patent Literature 1: Japanese Patent No. 5471867 (Gazette)
Patent Literature 2: Japanese Patent Laid-Open No. 2012-249344 (Gazette)

In Patent Literature 1, in order to ensure insulation between crossover portions of the inner circumferential end portions that pass axially outside the coil end group and the coil end group, it is necessary to dispose insulators between the crossover portions of the inner circumferential end portions and the coil end group, or to increase the distance between the crossover portions of the inner circumferential end portions and the coil end group. Furthermore, in order to pass axially outside the coil end group, the bending radius of the inner circumferential end portions must be increased when bending the inner circumferential end portions. The axial length of the stator winding is increased thereby, and one problem has been that axial dimensions of the stator are increased.

In Patent Literature 2, because the end portions of the winding bodies are connected to each other using busbars, the number of parts is increased, and welded positions are also increased in number, and one problem has been that productivity is reduced.

SUMMARY OF THE INVENTION

The present invention aims to solve the above problems and an object of the present invention is to provide a rotary electric machine that is compact and that has increased productivity.

A rotary electric machine according to the present invention is a rotary electric machine that is driven by a three-phase alternating-current, and includes: an annular stator core in which slots are formed at a ratio of n slots per phase per pole, where n is an integer that is greater than or equal to 2; and a stator that includes a stator winding that is mounted to the stator core. The stator winding includes a plurality of distributed-winding coils that are each constituted by a conductor, each of the plurality of coils includes: 2x slot-inserted portions that are inserted into the slots, where x is a natural number that is greater than or equal to 1; (2x−1) return portions that link the 2x slot-inserted portions consecutively by alternately connecting first end portions and second end portions in an axial direction of the stator core; a first terminal that extends outward from a slot-inserted portion that is positioned at a first end of the consecutive slot-inserted portions; and a second terminal that extends outward from a slot-inserted portion that is positioned at a second end of the consecutive slot-inserted portions, first terminals that constitute phase windings of the stator winding among the first terminals extend outward individually from a radially innermost position of each of the slots such that a direction of bending in a circumferential direction after extending outward from the slots is changed alternately in groups of n, second terminals that constitute phase windings of the stator winding among the second terminals extend outward individually from a radially outermost position of each of the slots such that a direction of bending in a circumferential direction after extending outward from the slots is changed alternately in groups of n, and the phase windings are configured in a first group of a group of the first terminals and a group of the second terminals by connecting together tip portions of terminals that are bent so as to extend outward from slots that are 3n slots apart and approach each other, and in a second group of the group of first terminals and the group of second terminals by connecting together tip portions of terminals that are bent so as to extend outward from slots that are (3n+1) slots apart and approach each other and also connecting together tip portions of terminals that are bent so as to extend outward from slots are (3n−1) slots apart and approach each other in modified positions of an inserted slot group, and by connecting together tip portions of terminals that are bent so as to extend outward from slots that are 3n slots apart and approach each other in regions other than the modified positions of the inserted slot group.

According to the present invention, because phase windings are configured by directly joining together first terminals that extend outward from radially innermost positions of slots, and directly joining together second terminals that extend outward from radially outermost positions of the slots, increases in axial dimensions of a stator winding are suppressed, enabling reductions in size to be achieved.

Because space for chucking the first terminals and the second terminals can be ensured when joining the first terminals together and joining the second terminals together, productivity is improved.

DETAILED DESCRIPTION OF THE PREFERRED EMBODIMENTS

Preferred embodiments of a rotary electric machine according to the present invention will now be explained with reference to the drawings.

Embodiment 1

Figure 1:
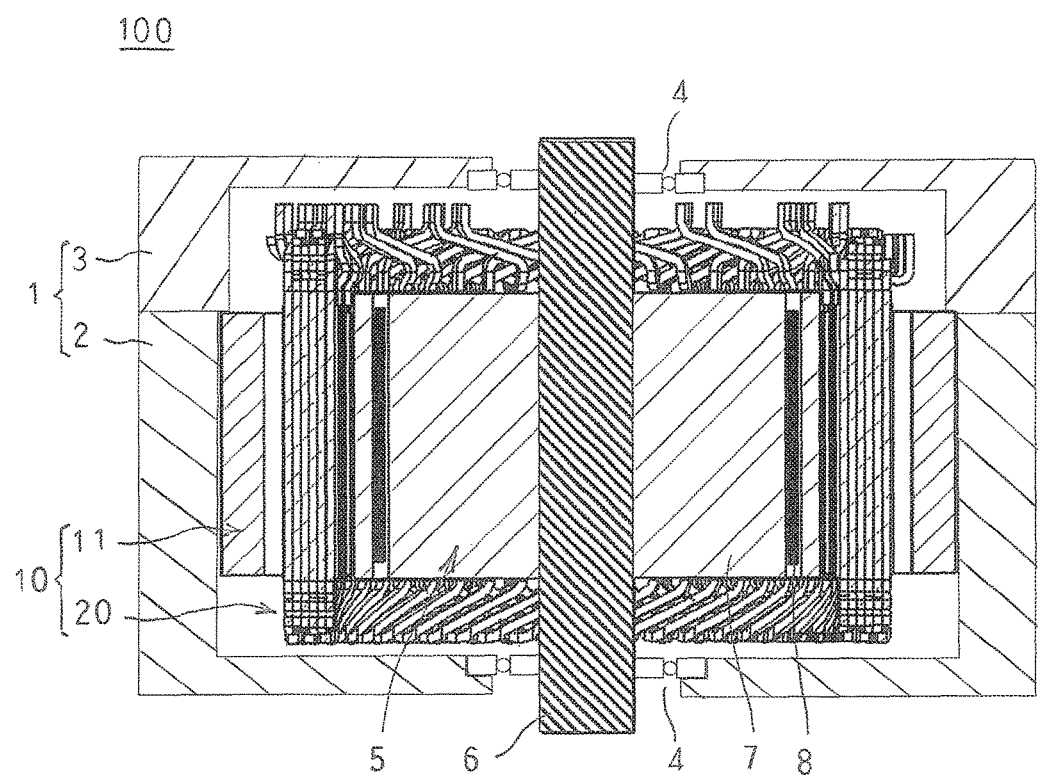
FIG. 1 is a cross section that shows a rotary electric machine according to Embodiment 1 of the present invention.
Figure 2:
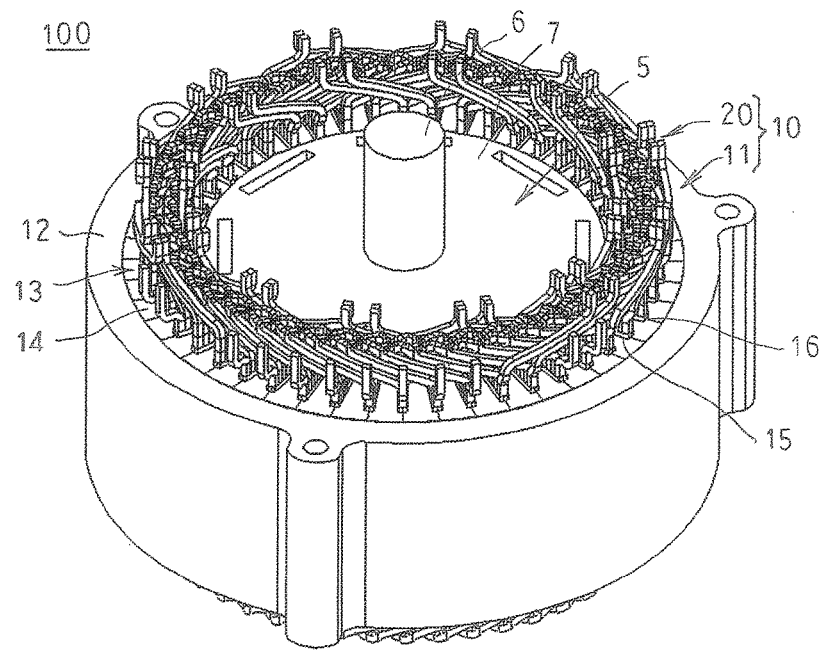
FIG. 2 is an oblique projection that shows part of the rotary electric machine according to Embodiment 1 of the present invention.
Figure 3:
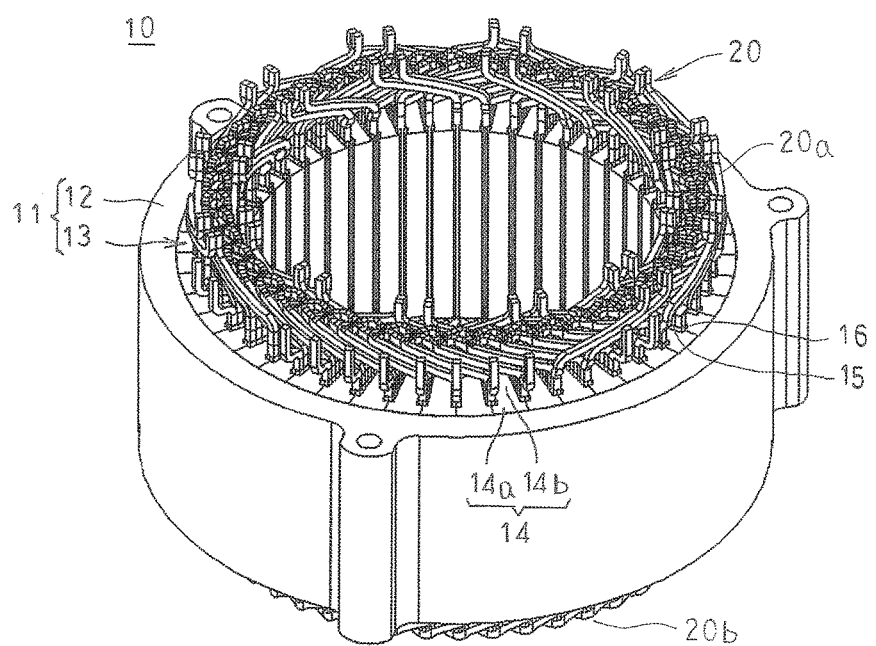
FIG. 3 is an oblique projection that shows a stator in the rotary electric machine according to Embodiment 1 of the present invention.
Figure 4:
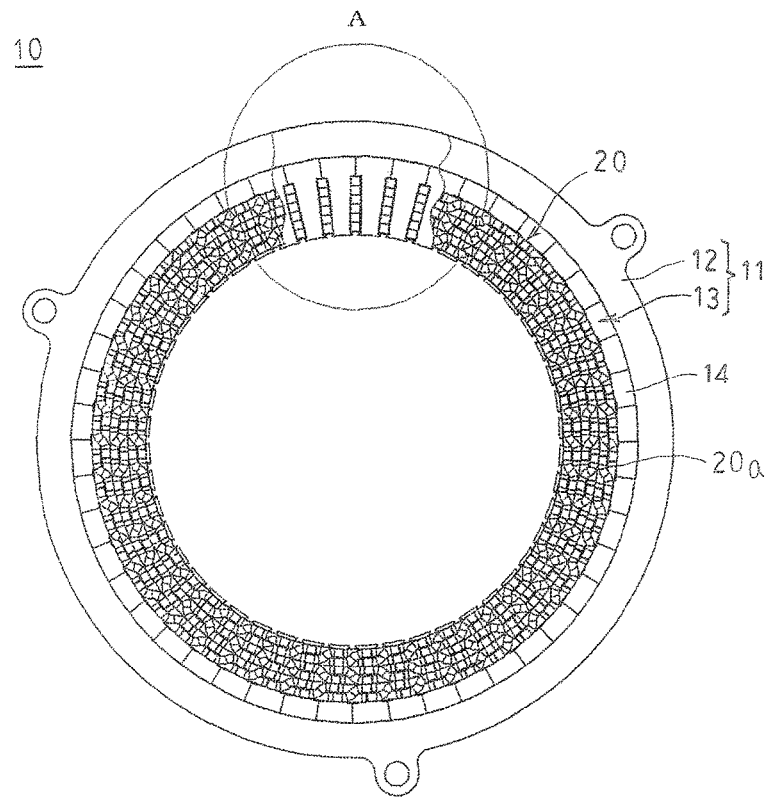
FIG. 4 is an end elevation that shows the stator in the rotary electric machine according to Embodiment 1 of the present invention when viewed from axially outside.
Figure 5:
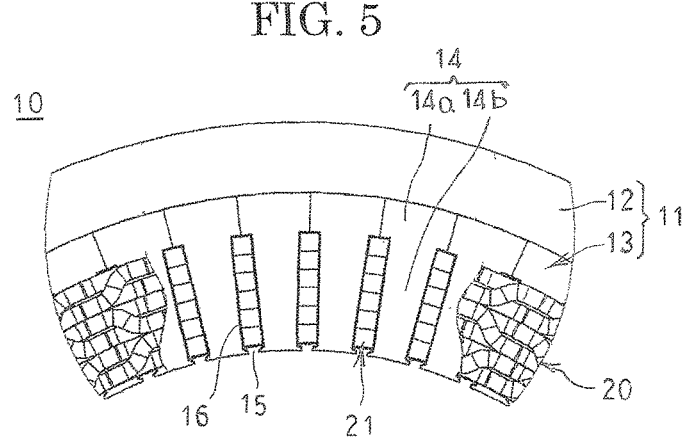
FIG. 5 is an enlargement of Portion A in FIG. 4.
Figure 6:
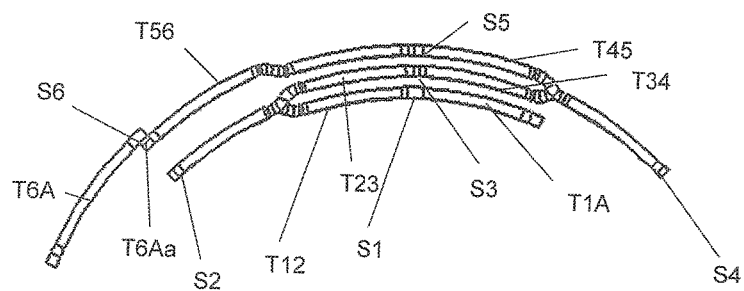
FIG. 6 is an end elevation that shows a first winding body that constitutes part of a stator winding of the stator in the rotary electric machine according to Embodiment 1 of the present invention when viewed from axially outside.
Figure 7:
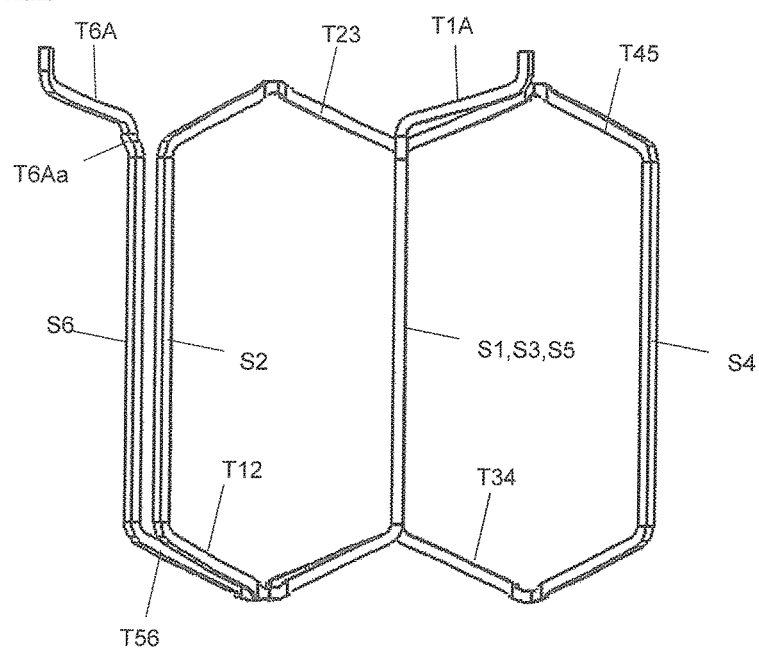
FIG. 7 is a front elevation that shows the first winding body that constitutes part of the stator winding of the stator in the rotary electric machine according to Embodiment 1 of the present invention when viewed from radially inside.
Figure 8:
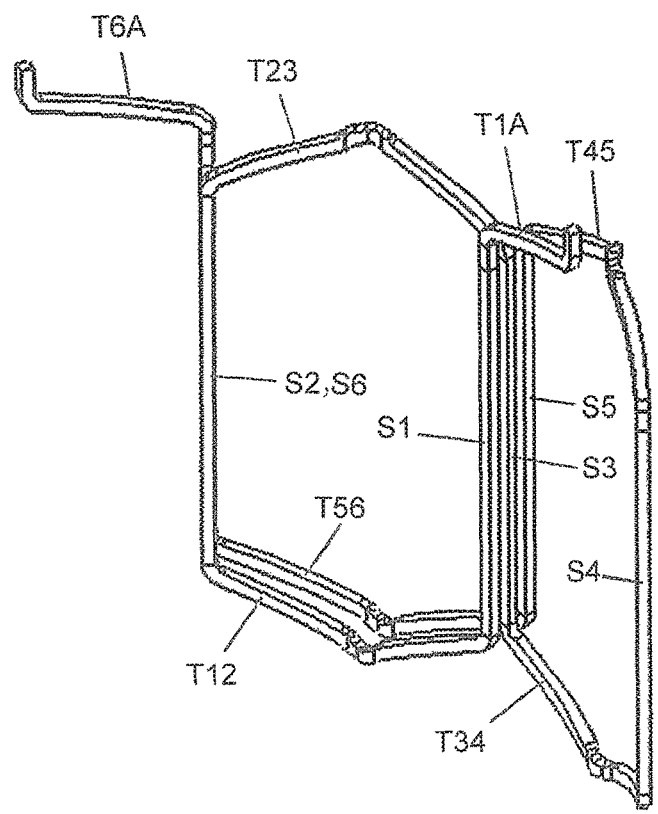
FIG. 8 is an oblique projection that shows the first winding body that constitutes part of the stator winding of the stator in the rotary electric machine according to Embodiment 1 of the present invention.
Figure 9:
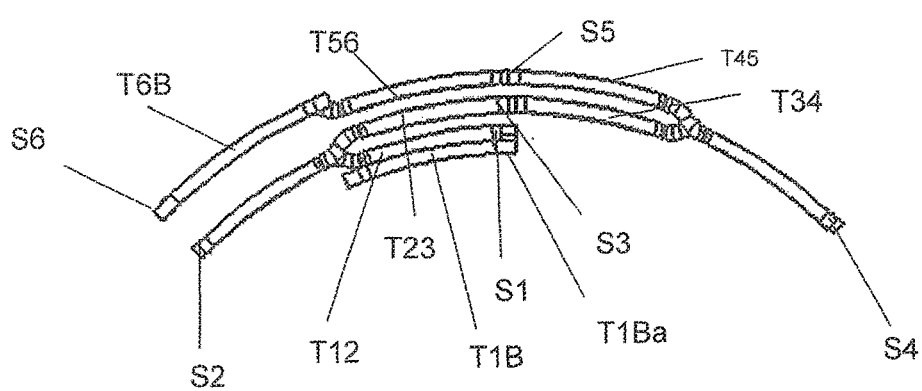
FIG. 9 is an end elevation that shows a second winding body that constitutes part of the stator winding of the stator in the rotary electric machine according to Embodiment 1 of the present invention when viewed from axially outside.
Figure 10:
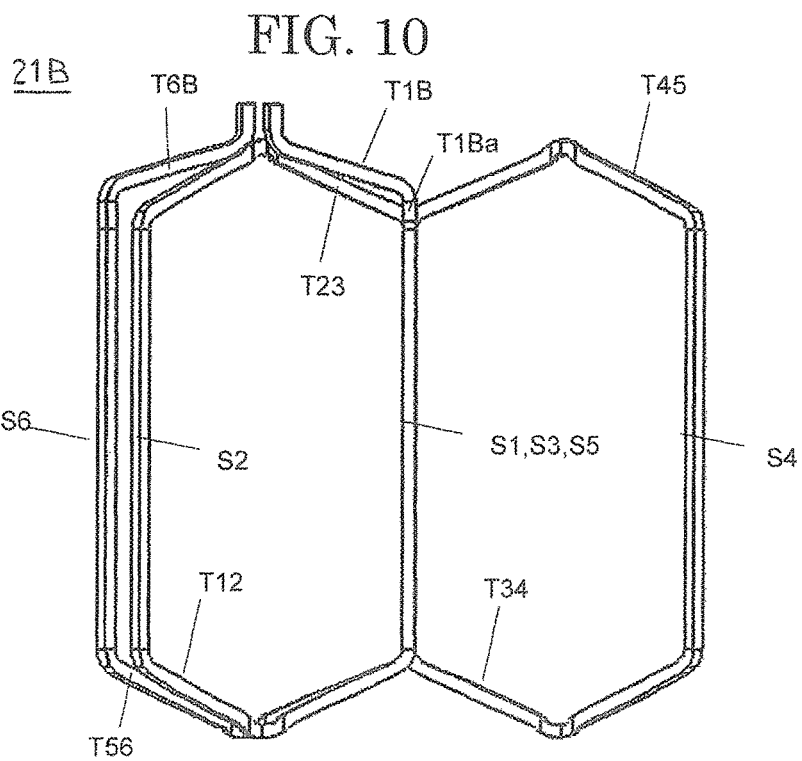
FIG. 10 is a front elevation that shows the second winding body that constitutes part of the stator winding of the stator in the rotary electric machine according to Embodiment 1 of the present invention when viewed from radially inside.
Figure 11:
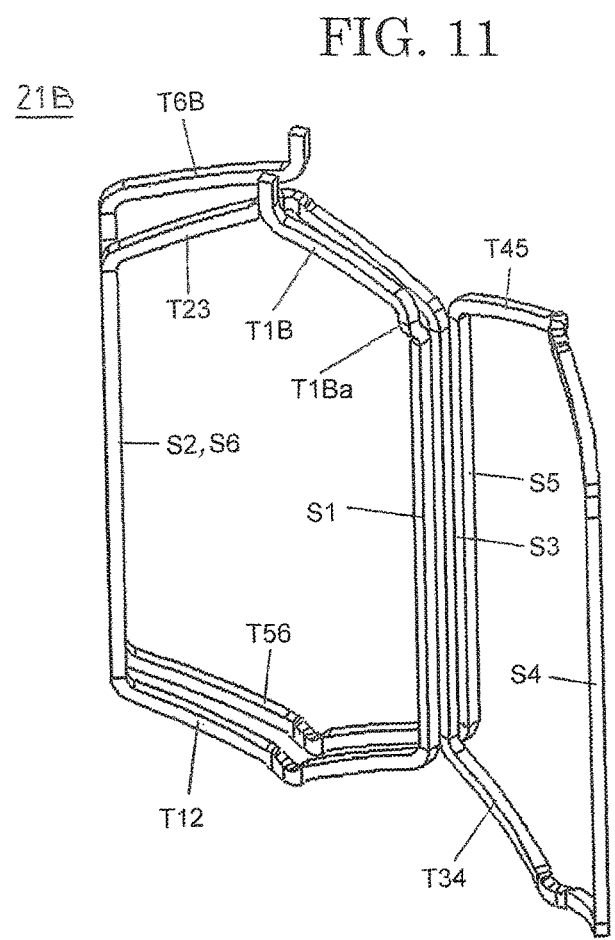
FIG. 11 is an oblique projection that shows the second winding body that constitutes part of the stator winding of the stator in the rotary electric machine according to Embodiment 1 of the present invention.
Figure 12:
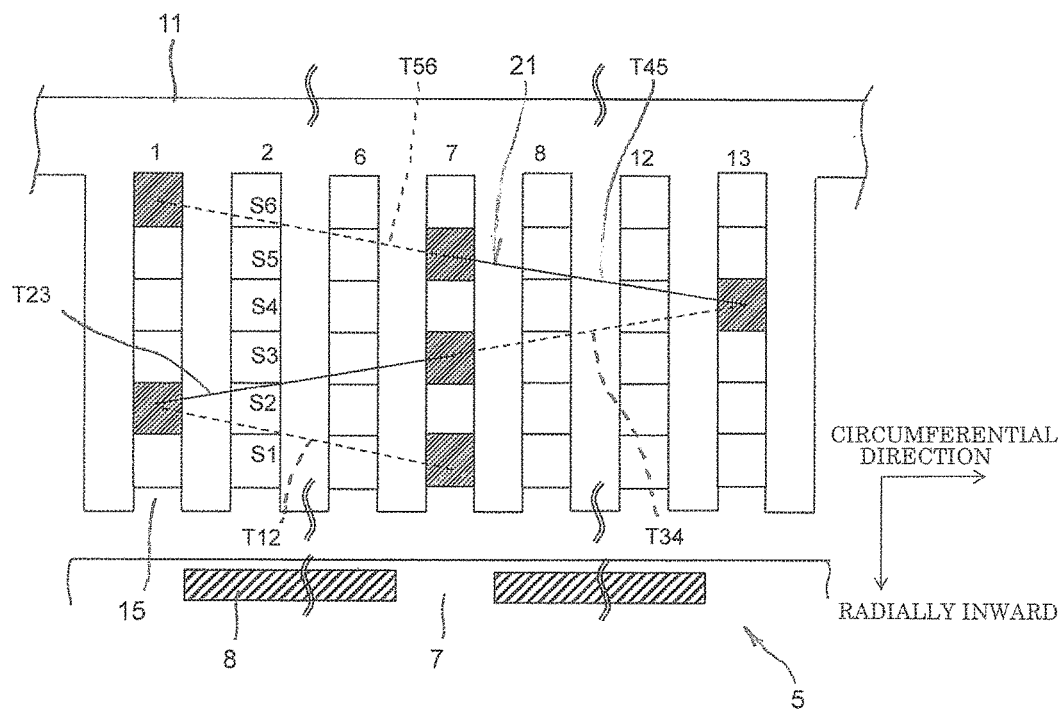
FIG. 12 is a partial cross section that schematically shows a slot-housed state of the winding bodies in the rotary electric machine according to Embodiment 1 of the present invention.
Figure 13:
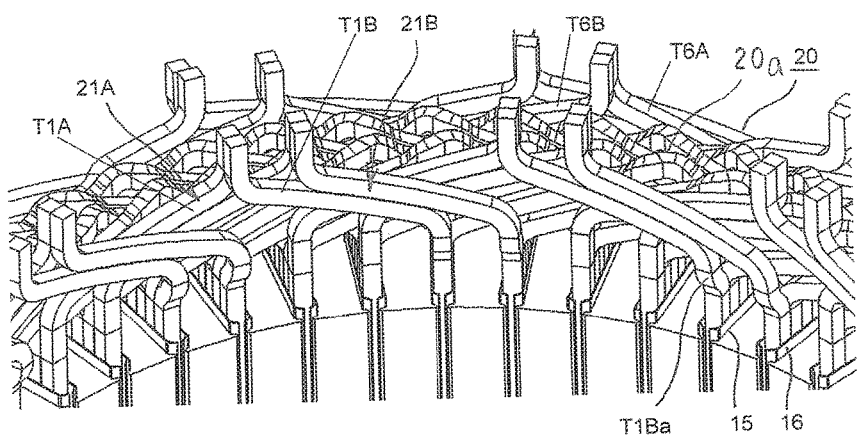
FIG. 13 is a partial oblique projection that shows the stator in the rotary electric machine according to Embodiment 1 of the present invention when viewed from a radially inner side.
Figure 14:
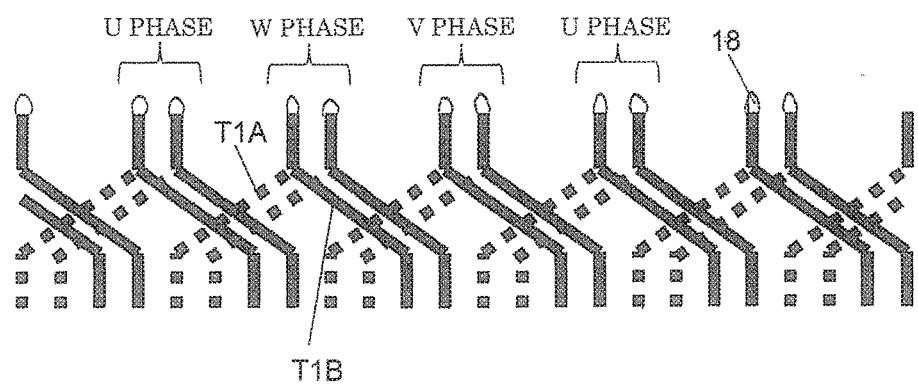
FIG. 14 is a schematic diagram that explains an arranged state of first return portions of the stator winding in the rotary electric machine according to Embodiment 1 of the present invention.
Figure 15:
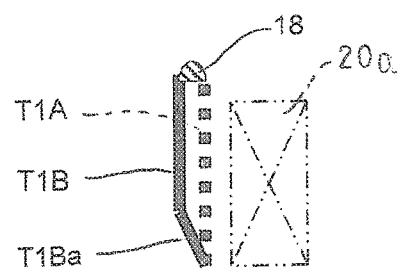
FIG. 15 is a schematic diagram that explains the arranged state of the first return portions of the stator winding in the rotary electric machine according to Embodiment 1 of the present invention.
Figure 16:
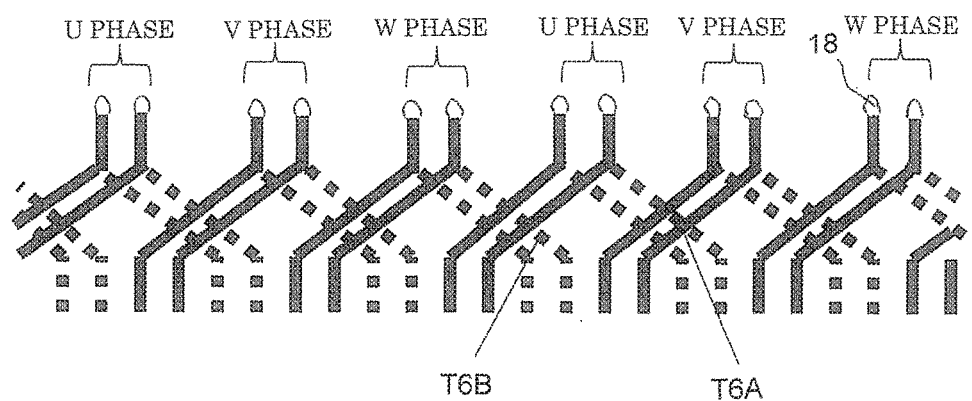
FIG. 16 is a schematic diagram that explains an arranged state of seventh return portions of the stator winding in regions of inserted slot groups other than modified positions in the rotary electric machine according to Embodiment 1 of the present invention.
Figure 17:
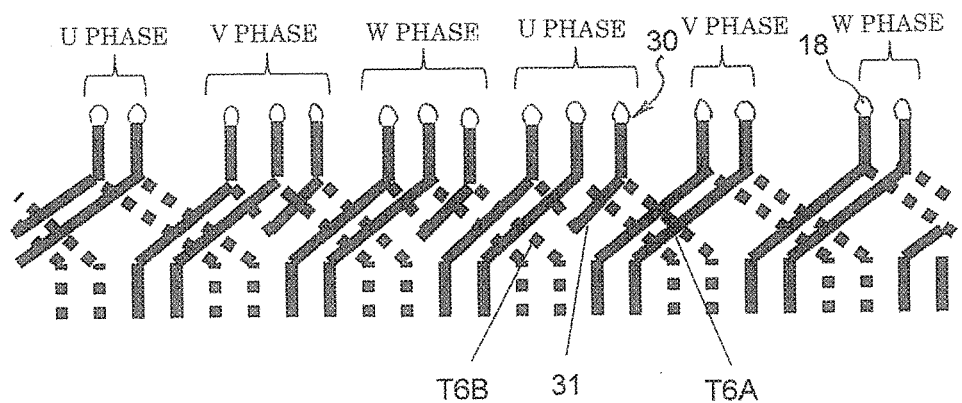
FIG. 17 is a schematic diagram that explains an arranged state of seventh return portions of the stator winding in regions of inserted slot groups at modified positions in the rotary electric machine according to Embodiment 1 of the present invention.
Figure 18:
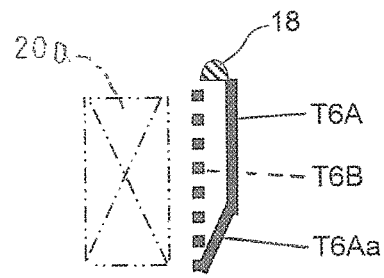
FIG. 18 is a schematic diagram that explains the arranged state of the seventh return portions of the stator winding in the rotary electric machine according to Embodiment 1 of the present invention.

FIG. 1 is a cross section that shows a rotary electric machine according to Embodiment 1 of the present invention, FIG. 2 is an oblique projection that shows part of the rotary electric machine according to Embodiment 1 of the present invention, FIG. 3 is an oblique projection that shows a stator in the rotary electric machine according to Embodiment 1 of the present invention, FIG. 4 is an end elevation that shows the stator in the rotary electric machine according to Embodiment 1 of the present invention when viewed from axially outside, FIG. 5 is an enlargement of Portion A in FIG. 4, FIG. 6 is an end elevation that shows a first winding body that constitutes part of a stator winding of the stator in the rotary electric machine according to Embodiment 1 of the present invention when viewed from axially outside, FIG. 7 is a front elevation that shows the first winding body that constitutes part of the stator winding of the stator in the rotary electric machine according to Embodiment 1 of the present invention when viewed from radially inside, FIG. 8 is an oblique projection that shows the first winding body that constitutes part of the stator winding of the stator in the rotary electric machine according to Embodiment 1 of the present invention, FIG. 9 is an end elevation that shows a second winding body that constitutes part of the stator winding of the stator in the rotary electric machine according to Embodiment 1 of the present invention when viewed from axially outside, FIG. 10 is a front elevation that shows the second winding body that constitutes part of the stator winding of the stator in the rotary electric machine according to Embodiment 1 of the present invention when viewed from radially inside, FIG. 11 is an oblique projection that shows the second winding body that constitutes part of the stator winding of the stator in the rotary electric machine according to Embodiment 1 of the present invention, FIG. 12 is a partial cross section that schematically shows a slot-housed state of the winding bodies in the rotary electric machine according to Embodiment 1 of the present invention, FIG. 13 is a partial oblique projection that shows the stator in the rotary electric machine according to Embodiment 1 of the present invention when viewed from a radially inner side, FIGS. 14 and 15 are schematic diagrams that explain an arranged state of first return portions of the stator winding in the rotary electric machine according to Embodiment 1 of the present invention, FIG. 16 is a schematic diagram that explains an arranged state of seventh return portions of the stator winding in regions of inserted slot groups other than modified positions in the rotary electric machine according to Embodiment 1 of the present invention, FIG. 17 is a schematic diagram that explains an arranged state of seventh return portions of the stator winding in regions of inserted slot groups at modified positions in the rotary electric machine according to Embodiment 1 of the present invention, and FIG. 18 is a schematic diagram that explains the arranged state of the seventh return portions of the stator winding in the rotary electric machine according to Embodiment 1 of the present invention. Moreover, in FIG. 12, only slot-inserted portions of the winding bodies are depicted, and 1, 2, etc., through 12, and 13 are Slot Numbers that are allotted to the slots in circumferential order.

In FIGS. 1 and 2, a rotary electric machine 100 includes: a housing 1 that has: a floored cylindrical frame 2; and an end plate 3 that closes an opening of the frame 2; a stator 10 that is inserted into and held by an internal portion of a cylindrical portion of the frame 2; and a rotor 5 that is fixed to a rotating shaft 6 that is rotatably supported in the floor portion of the frame 2 and the end plate 3 by means of bearings 4 so as to be rotatably disposed on an inner circumferential side of the stator 10.

The rotor 5 is a permanent-magnet rotor that includes: a rotor core 7 that is fixed to the rotating shaft 6, which is inserted through a central position thereof; and permanent magnets 8 that are embedded in a vicinity of an outer circumferential surface of the rotor core 7 so as to be arranged at a uniform pitch circumferentially to constitute magnetic poles. Moreover, the rotor 5 is not limited to a permanent-magnet rotor, and a squirrel-cage rotor in which uninsulated rotor conductors are housed in slots of a rotor core such that two sides are shorted by a shorting ring, or a wound rotor in which insulated conductor wires are mounted into slots of a rotor core, etc., may be used.

Next, configuration of the stator 10 will be explained in detail with reference to FIGS. 2 through 10. Moreover, to facilitate explanation, an axial direction of the rotating shaft 6 will be designated an axial direction, a radial direction of the rotating shaft 6 will be designated a radial direction, and a direction of rotation around a central axis of the rotating shaft 6 will be designated a circumferential direction.

As shown in FIG. 3, the stator 10 includes: a stator core 11; a stator winding 20 that is mounted to the stator core 11; and insulating members 16 that are mounted into slots 15 of the stator core 11. The stator winding 20 is configured by connecting winding bodies 21 that function as a plurality of coils that are mounted into the stator core 11. The insulating members 16 are formed into angular C shapes by bending and shaping oblong sheets that are produced by sandwiching a polyimide film between meta-aramid fibers, for example, and are inserted into the slots 15 to insulate the stator core 11 and the stator winding 20 electrically.

Here, to facilitate explanation, the number of poles in the rotor 5 is eight, the number of slots in the stator core 11 is forty-eight, and the stator winding 20 is a three-phase winding. In other words, the slots 15 are formed on the stator core 11 at a ratio of two slots per phase per pole.

As shown in FIGS. 3 through 5, the stator core 11 include: an annular outer core 12; and an inner core 13 that is inserted into and held inside the outer core 12. The inner core 13 includes forty-eight core blocks 14. The core blocks 14 include: a circular arc-shaped core back portion 14a; and a tooth 14b that protrudes radially inward from an inner circumferential wall surface of the core back portion 14a. The forty-eight core blocks 14 are inserted into and held inside the outer core 12 by press-fitting, shrink-fitting, etc., so as to be arranged into an annular shape such that circumferential side surfaces of the core back portions 14a are butted against each other. The forty-eight core blocks 14 are arranged into the annular shape to constitute the inner core 13. Regions that are surrounded by the circumferentially adjacent core back portions 14a and the teeth 14b constitute slots 15.

Here, the outer core 12 is produced by laminating and integrating a predetermined number of electromagnetic steel sheets that have been punched into an annular shape, for example. The core blocks 14 are produced by laminating and integrating a predetermined number of electromagnetic steel sheets that have been punched into T shapes, for example.

The stator core 11 is configured such that forty-eight core blocks 14 that are arranged into an annular shape are inserted into and held inside the outer core 12 by press-fitting, shrink-fitting, etc., but a cylindrical member that is produced using a nonmagnetic material such as aluminum may be used instead of the outer core 12.

The stator winding 20 has a plurality of winding bodies 21. The winding bodies 21 are constituted by first winding bodies 21A and second winding bodies 21B that have terminals that extend in different directions. Here, the first winding bodies 21A and the second winding bodies 21B are basically identical, and will be distinguished by the suffixes A and B. Furthermore, only the reference numbers will be used when naming the winding bodies generally.

The first winding bodies 21A are produced by winding a conductor wire 19 that has an oblong cross section, that is made of jointless continuous copper wire or aluminum wire that is coated with an insulating enamel resin, for example, into a first slot, a second slot, and a third slot that line up at a spacing of six slots circumferentially, in a figure of eight that is formed by inserting the conductor wire 19 so as to alternate an axial direction of insertion into the first slot, the second slot, and the third slot, sequentially in order of the second slot, the first slot, the second slot, the third slot, the second slot, and the first slot. The first winding bodies 21A that are produced in this manner are distributed-winding lap windings. Moreover, a conductor wire that has a circular cross section may be used instead of the conductor wire 19 that has an oblong cross section. Furthermore, a spacing of six slots is a pitch between slot centers of slots 15 that are positioned on two sides of six circumferentially consecutive teeth 14b, and in this case corresponds to a pitch of one magnetic pole.

As shown in FIGS. 6 through 8, the first winding bodies 21A include: first, second, third, fourth, fifth, and sixth slot-inserted portions S1 through S6 that form three columns so as to have a spacing of six slots; a first return portion T1A that extends outward from a first end of the first slot-inserted portion S1; a second return portion T12 that links together second ends of the first and second slot-inserted portions S1 and S2; a third return portion T23 that links together first ends of the second and third slot-inserted portions S2 and S3; a fourth return portion T34 that links together second ends of the third and fourth slot-inserted portions S3 and S4; a fifth return portion T45 that links together first ends of the fourth and fifth slot-inserted portions S4 and S5; a sixth return portion T56 that links together second ends of the fifth and sixth slot-inserted portions S5 and S6; and a seventh return portion T6A that extends outward from a first end of the sixth slot-inserted portion S1. Here, the first return portion T1A constitutes a first terminal, and the seventh return portion T6A constitutes a second terminal.

The first and second slot-inserted portions S1 and S2 are radially displaced by an amount equal to a radial thickness of the conductor wire 19 by a crank portion that is formed at a circumferentially intermediate position on the second return portion T12. The second and third slot-inserted portions S2 and S3 are radially displaced by an amount equal to the radial thickness of the conductor wire 19 by a crank portion that is formed at a circumferentially intermediate position on the third return portion T23. The third and fourth slot-inserted portions S3 and S4 are radially displaced by an amount equal to the radial thickness of the conductor wire 19 by a crank portion that is formed at a circumferentially intermediate position on the fourth return portion T34. The fourth and fifth slot-inserted portions S4 and S5 are radially displaced by an amount equal to the radial thickness of the conductor wire 19 by a crank portion that is formed at a circumferentially intermediate position on the fifth return portion T45. The fifth and sixth slot-inserted portions S5 and S6 are radially displaced by an amount equal to the radial thickness of the conductor wire 19 by a crank portion that is formed at a circumferentially intermediate position on the sixth return portion T56.

The second return portion T12 extends from the second end of the first slot-inserted portion S1 to a radially inner end portion of the crank portion so as to maintain a radial position, and extends from a radially outer end portion of the crank portion to the second end of the second slot-inserted portion S2 so as to maintain a radial position. In other words, the second return portion T12 is constituted by: a crank portion that constitutes an apex portion; and a pair of oblique portions that are positioned at two circumferential ends of the crank portion. The third return portion T23, the fourth return portion 34, etc., through the sixth return portion T56 are configured in a similar or identical manner to that of the second return portion T12.

The first return portion T1A extends outward from the first end of the first slot-inserted portion S1 so as to be parallel to an oblique portion that is connected to the first end of the fifth slot-inserted portion S5 of the fifth return portion T45 so as to maintain a radial position, and is then bent to extend axially outward.

The seventh return portion T6A extends outward from the first end of the sixth slot-inserted portion S6, is then displaced radially outward by an amount equal to the radial thickness of the conductor wire 19 at a crank portion T6Aa, subsequently extends so as to be parallel to an oblique portion that is connected to the first end of the third slot-inserted portion S3 of the third return portion T23 so as to maintain a radial position, and is then bent to extend axially outward. Moreover, the amount of radially outward displacement by the crank portion T6Aa may be made greater than the radial thickness of the conductor wire 19.

As shown in FIGS. 9 through 11, the second winding bodies 21B are produced by winding a conductor wire 19 into a first slot, a second slot, and a third slot that line up at a spacing of six slots circumferentially, in a figure of eight that is formed by inserting the conductor wire 19 so as to alternate an axial direction of insertion into the first slot, the second slot, and the third slot, sequentially in order of the second slot, the first slot, the second slot, the third slot, the second slot, and the first slot in a similar manner to the first winding bodies 21A.

Specifically, the second winding bodies 21B include first, second, third, fourth, fifth, and sixth slot-inserted portions S1 through S6, and first, second, third, fourth, fifth, sixth, and seventh return portions T1B, T12, T23, T34, T45, T56, and T6B. Here, the first return portion T1B constitutes a first terminal, and the seventh return portion T6B constitutes a second terminal.

The first return portion T1B extends outward from the first end of the first slot-inserted portion S1, is then displaced radially inward by an amount equal to the radial thickness of the conductor wire 19 at a crank portion T1Ba, subsequently extends so as to be parallel to an oblique portion that is connected to the first end of the fourth slot-inserted portion S4 of the fifth return portion T45 so as to maintain a radial position, and is then bent to extend axially outward. Moreover, the amount of radially inward displacement by the crank portion T1Ba may be made greater than the radial thickness of the conductor wire 19.

The seventh return portion T6B extends outward from the first end of the sixth slot-inserted portion S6 so as to be parallel to an oblique portion that is connected to the first end of the second slot-inserted portion S2 of the third return portion T23 so as to maintain a radial position, and is then bent to extend axially outward.

In this manner, the second winding bodies 21B are produced in a similar or identical manner to the first winding bodies 21A except that the bent shapes of the first return portion T1B and the seventh return portion T6B are different.

As shown in FIG. 12, the first slot-inserted portion S1 of the winding bodies 21 is inserted at a position of a first layer in the slot 15 at Number 7, the second slot-inserted portion S2 is inserted at a position of a second layer in the slot 15 at Number 1, the third slot-inserted portion S3 is inserted at a position of a third layer in the slot 15 at Number 7, the fourth slot-inserted portion S4 s inserted at a position of a fourth layer in the slot 15 at Number 13, the fifth slot-inserted portion S5 is inserted at a position of a fifth layer in the slot 15 at Number 7, and the sixth slot-inserted portion S6 is inserted at a position of a sixth layer in the slot 15 at Number 1.

The winding bodies 21 are mounted to the stator core 11 in this manner at a pitch of one slot circumferentially so as to be equal in number to the slots 15. First, second, third, fourth, fifth, and sixth slot-inserted portions S1 through S6 that are constituted by three winding bodies 21 are thereby inserted into six layers so as to line up in a single column in a radial direction in each of the slots 15. Moreover, the first layer is the layer at a radially innermost position among the six layers of the first through sixth slot-inserted portions S1 through S6 that are inserted so as to line up in the single columns inside the slots 15, and the sixth layer is the layer at a radially outermost position.

Specifically, pairs of first winding bodies 21A and second winding bodies 21B are mounted to the stator core 11 so as to alternate circumferentially at a pitch of one slot. A layer of third return portions T23 in which the third return portions T23 are arranged circumferentially at a pitch of one slot and a layer of fifth return portions T45 in which the fifth return portions T45 are arranged circumferentially at a pitch of one slot are thereby arranged into two layers in a radial direction at a first axial end of the stator core 11 to constitute first coil ends 20a. As shown in FIG. 13, directions of inclination of the oblique portions of the first return portions T1A and T1B that extend outward from the first layers in the slots 15 are arranged circumferentially around a radially inner side of the first coil ends 20a so as to be oriented in opposite directions alternately in pairs. Similarly, directions of inclination of the oblique portions of the seventh return portions T6A and T6B that extend outward from the sixth layers in the slots 15 are arranged circumferentially around a radially outer side of the first coil ends 20a so as to be oriented in opposite directions alternately in pairs. A layer of second return portions T12 in which the second return portions T12 are arranged circumferentially at a pitch of one slot, a layer of fourth return portions T34 in which the fourth return portions T34, and a layer of sixth return portions T56 in which the sixth return portions T56 are arranged circumferentially at a pitch of one slot are thereby arranged into three layers in a radial direction at a second axial end of the stator core 11 to constitute second coil ends 20b.

As shown in FIGS. 13 and 14, end portions of the first return portions T1A of the first winding bodies 21A and end portions of the first return portions T1B of the second winding bodies 21B that extend outward at a pitch of one magnetic pole, i.e., from slots 15 that are six slots apart are arranged so as to overlap in a radial direction on a radially inner side of the first coil ends 20a. The end portions of the first return portions T1A and T1B that overlap in a radial direction are joined together by joint portions 18. Sets of joint portions 18 between the end portions of the first return portions T1A and T1B that overlap in a radial direction that are arranged in pairs at a spacing of one slot are arranged circumferentially at a spacing of four slots. As shown in FIG. 15, the oblique portions of the first return portions T1B are displaced by an amount equal to the radial thickness of the conductor wire 19 radially inward by crank portions T1Ba that are formed on root portions, such that interference with the first return portions T1A is avoided.

Similarly, the oblique portions of the seventh return portions T6B are displaced by an amount equal to the radial thickness of the conductor wire 19 radially inward by crank portions T6Ba that are formed on root portions such that interference with the seventh return portions T6A is avoided.

As shown in FIG. 16, in a region other than modified positions of the inserted slot group on a radially outer side of the first coil ends 20a, end portions of the seventh return portions T6A of the first winding bodies 21A and end portions of the seventh return portions T6B of the second winding bodies 21B that extend outward from slots 15 that are six slots apart are arranged so as to overlap in a radial direction. The end portions of the seventh return portions T6A and T6B that overlap in a radial direction are joined together by joint portions 18. Sets of joint portions 18 between the seventh return portions T6A and T6B that are arranged in pairs at a spacing of one slot are arranged circumferentially at a spacing of four slots.

As shown in FIG. 17, in a region in a vicinity of modified positions 30 of the inserted slot group on a radially outer side of the first coil ends 20a, end portions of the seventh return portions T6A of the first winding bodies 21A and end portions of the seventh return portions T6B of the second winding bodies 21B that extend outward from slots 15 that are five slots apart are arranged so as to overlap in a radial direction. The end portions of the seventh return portions T6A and T6B that overlap in a radial direction are joined together by joint portions 18. End portions of the seventh return portions T6A of the first winding bodies 21A and end portions of the seventh return portions T6B of the second winding bodies 21B that extend outward from slots 15 that are seven slots apart are connected by crossover wires 31.

As shown in FIG. 18, the oblique portions of the seventh return portions T6A are displaced by an amount equal to the radial thickness of the conductor wire 19 radially inward by the crank portions T6Aa that are formed on root portions such that interference with the seventh return portions T6B is avoided.

Here, as shown in FIGS. 14 and 16, the sets of joint portions 18 between the first return portions T1A and T1B that are arranged in pairs at a spacing of one slot have identical phases.

In this manner, respective phase windings of the stator winding 20 are configured by joining together the first return portions T1A and T1B of the first winding bodies 21A and the second winding bodies 21B that constitute the phase windings by welding, etc., and by joining together the seventh return portions T6A and T6B by welding, etc.

Figure 19:
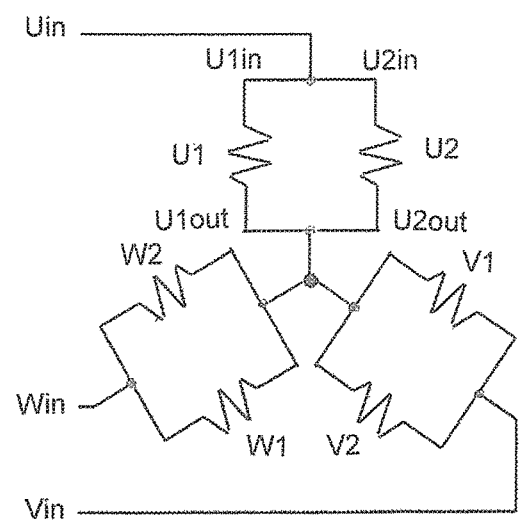
FIG. 19 is a diagram that explains a connection pattern for the stator winding in the rotary electric machine according to Embodiment 1 of the present invention.

Next, a specific connection pattern for the stator winding 20 will be explained. FIG. 19 is a diagram that explains a connection pattern for the stator winding in the rotary electric machine according to Embodiment 1 of the present invention.

As shown in FIG. 19, the stator winding 20 is configured by wye-connecting a U-phase coil, a V-phase coil, and a W-phase coil. The U-phase coil is configured by connecting a U1-phase coil and a U2-phase coil in parallel. The V-phase coil is configured by connecting a V1-phase coil and a V2-phase coil in parallel. The W-phase coil is configured by connecting a W1-phase coil and a W2-phase coil in parallel. Uin, Vin, and Win are electric power supplying portions.

Figure 20:
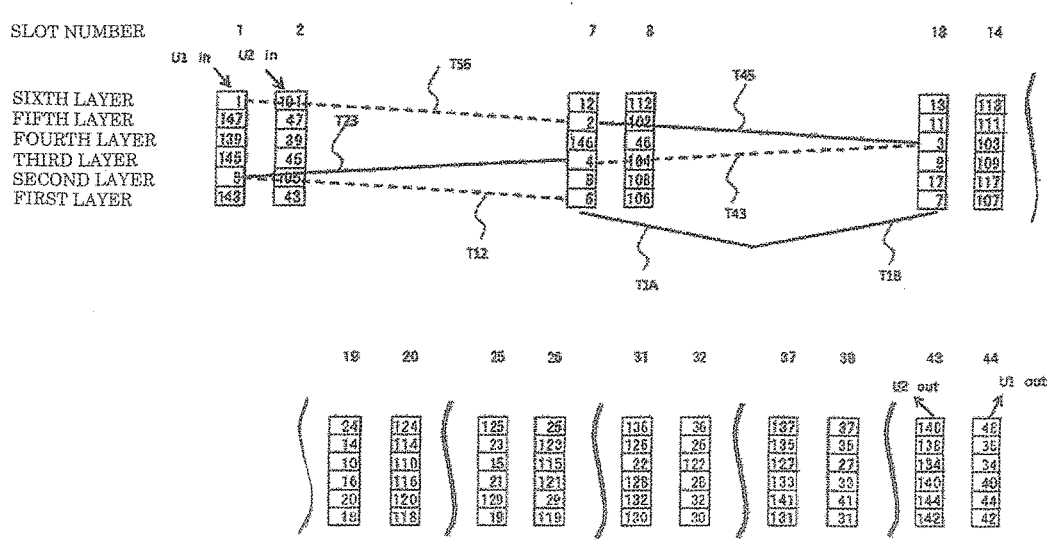
FIG. 20 is a diagram that shows a connection pattern for a U-phase coil in the rotary electric machine according to Embodiment 1 of the present invention.
Figure 21:
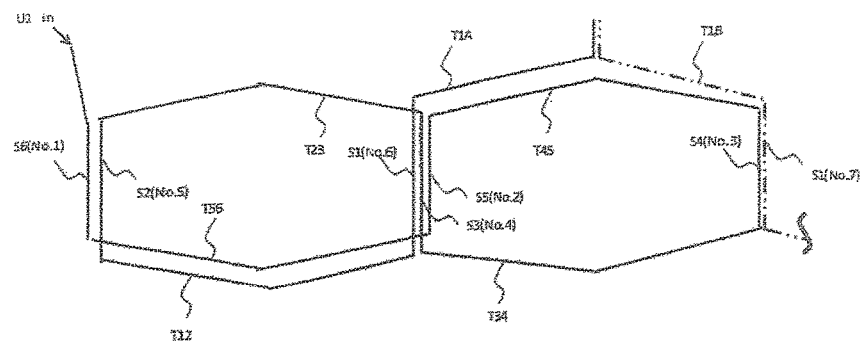
FIG. 21 is a schematic diagram that shows a winding body of the U-phase coil when viewed from radially inside.

Next, a specific connection pattern from the electric power supplying portion Uin in the U-phase coil to a neutral point will be explained. FIG. 20 is a diagram that shows a connection pattern for a U-phase coil in the rotary electric machine according to Embodiment 1 of the present invention, and FIG. 21 is a schematic diagram that shows a winding body of the U-phase coil when viewed from radially inside. Moreover, in FIG. 20, 1 through 48 are slot numbers that are allotted to the slots of the stator core sequentially in a circumferential direction. The slots are arranged in an annular shape at a pitch of 7.5 degrees, but for convenience they are shown opened out in a straight line in FIG. 20. In FIG. 20, a vertical direction on the surface of the page is a radial direction, left and right on the surface of the page is a circumferential direction, and a direction that is perpendicular to the surface of the page is an axial direction. In FIG. 20, the slot-inserted portions of the winding bodies are represented by squares, and six slot-inserted portions are arranged in a single column in the radial direction in each of the slots. Numbers that are allotted to the slot-inserted portions represent the order in which they are connected from the electric power supplying end to the neutral point. The layers of the slot-inserted portions that are inserted into the slots are designated a first layer, a second layer, etc., through a sixth layer from a radially inner side. Moreover, the same applies to FIGS. 22, 24, and 26. In FIG. 21, numbers that are allotted to the slot-inserted portions represent the order in which they are connected from the electric power supplying end to the neutral point. Moreover, the same applies to FIGS. 23, 25, and 27.

The U1-phase coil is configured by connecting the first and second winding bodies 21A and 21B that are inserted into a slot group that includes Slot Numbers {1+6(m−1)} and Slot Numbers {2+6(m−1)}. Here, m is an integer that is greater than or equal to 1 and less than or equal to 8.

First, the sixth slot-inserted portion S6 that is positioned in the sixth layer of Slot Number 1 is connected by the sixth return portion T56 to the fifth slot-inserted portion S5 that is positioned in the fifth layer of Slot Number 7. The fifth slot-inserted portion S5 is connected by the fifth return portion T45 to the fourth slot-inserted portion S4 that is positioned in the fourth layer of Slot Number 13. The fourth slot-inserted portion S4 is connected by the fourth return portion T34 to the third slot-inserted portion S3 that is positioned in the third layer of Slot Number 7. The third slot-inserted portion S3 is connected by the third return portion T23 to the second slot-inserted portion S2 that is positioned in the second layer of Slot Number 1. The second slot-inserted portion S2 is connected by the second return portion T12 to the first slot-inserted portion S1 that is positioned in the first layer of Slot Number 7. The first slot-inserted portion S1 is connected by the first return portions T1A and T1B to the first slot-inserted portion S1 that is positioned in the first layer of Slot Number 13.

This operation is repeated to connect the slot-inserted portion at Number 1 through to the slot-inserted portion at Number 24 such that the first and second winding bodies 21A and 21B that are inserted into a slot group that includes Slot Numbers {1+6(m−1)} are connected in series alternately in pairs.

Next, the sixth slot-inserted portion S6 that is positioned in the sixth layer of Slot Number 19 is connected by the seventh return portions T6A and T6B to the sixth slot-inserted portion S6 that is positioned in the sixth layer of Slot Number 26 that is seven slots away. The position at which the sixth slot-inserted portion S6 that is positioned in the sixth layer of Slot Number 19 is connected to the sixth slot-inserted portion S6 that is positioned in the sixth layer of Slot Number 26 that is seven slots away constitutes a modified position 30 of the inserted slot group.

The sixth slot-inserted portion S6 that is positioned in the sixth layer of Slot Number 26 is connected by the sixth return portion T56 to the fifth slot-inserted portion S5 that is positioned in the fifth layer of Slot Number 32. The fifth slot-inserted portion S5 is connected by the fifth return portion T45 to the fourth slot-inserted portion S4 that is positioned in the fourth layer of Slot Number 38. The fourth slot-inserted portion S4 is connected by the fourth return portion T34 to the third slot-inserted portion S3 that is positioned in the third layer of Slot Number 32. The third slot-inserted portion S3 is connected by the third return portion T23 to the second slot-inserted portion S2 that is positioned in the second layer of Slot Number 26. The second slot-inserted portion S2 is connected by the second return portion T12 to the first slot-inserted portion S1 that is positioned in the first layer of Slot Number 32. The first slot-inserted portion S1 is connected by the first return portions T1A and T1B to the first slot-inserted portion S1 that is positioned in the first layer of Slot Number 38.

This operation is repeated to connect the slot-inserted portion at Number 25 through to the slot-inserted portion at Number 48 such that the first and second winding bodies 21A and 21B that are inserted into a slot group that includes Slot Numbers {2+6(m−1)} are connected.

A U1-phase coil that makes approximately one lap of the stator core 11 is thereby configured, in which four winding bodies 21 that are inserted into the slot group at Slot Numbers {1+6(m−1)} and four winding bodies 21 that are inserted into the slot group at Slot Numbers {2+6(m−1)} are connected in series. The seventh return portion T6B that extends outward from the sixth slot-inserted portion S6 that is positioned in the sixth layer of Slot Number 1 becomes an electric power supplying portion U1in of the U1-phase coil, and the seventh return portion T6B that extends outward from the sixth slot-inserted portion S6 that is positioned in the sixth layer of Slot Number 44 becomes a neutral point U1out.

Next, the U2-phase coil is configured by connecting the first and second winding bodies 21A and 21B that are inserted into a slot group that includes Slot Numbers {1+6(m−1)} and Slot Numbers {2+6(m−1)}.

First, the sixth slot-inserted portion S6 that is positioned in the sixth layer of Slot Number 2 is connected by the sixth return portion T56 to the fifth slot-inserted portion S5 that is positioned in the fifth layer of Slot Number 8. The fifth slot-inserted portion S5 is connected by the fifth return portion T45 to the fourth slot-inserted portion S4 that is positioned in the fourth layer of Slot Number 14. The fourth slot-inserted portion S4 is connected by the fourth return portion T34 to the third slot-inserted portion S3 that is positioned in the third layer of Slot Number 8. The third slot-inserted portion S3 is connected by the third return portion T23 to the second slot-inserted portion S2 that is positioned in the second layer of Slot Number 2. The second slot-inserted portion S2 is connected by the second return portion T12 to the first slot-inserted portion S1 that is positioned in the first layer of Slot Number 8. The first slot-inserted portion S1 is connected by the first return portions T1A and T1B to the first slot-inserted portion S1 that is positioned in the first layer of Slot Number 14.

This operation is repeated to connect the slot-inserted portion at Number 101 through to the slot-inserted portion at Number 124 such that the first and second winding bodies 21A and 21B that are inserted into a slot group that includes Slot Numbers {2+6(m−1)} are connected.

Next, the sixth slot-inserted portion S6 that is positioned in the sixth layer of Slot Number 20 is connected by the seventh return portions T6A and T6B to the sixth slot-inserted portion S6 that is positioned in the sixth layer of Slot Number 25 that is five slots away. The position at which the sixth slot-inserted portion S6 that is positioned in the sixth layer of Slot Number 20 is connected to the sixth slot-inserted portion S6 that is positioned in the sixth layer of Slot Number 25 that is five slots away constitutes a modified position 30 of the inserted slot group.

The sixth slot-inserted portion S6 that is positioned in the sixth layer of Slot Number 25 is connected by the sixth return portion T56 to the fifth slot-inserted portion S5 that is positioned in the fifth layer of Slot Number 31. The fifth slot-inserted portion S5 is connected by the fifth return portion T45 to the fourth slot-inserted portion S4 that is positioned in the fourth layer of Slot Number 37. The fourth slot-inserted portion S4 is connected by the fourth return portion T34 to the third slot-inserted portion S3 that is positioned in the third layer of Slot Number 31. The third slot-inserted portion S3 is connected by the third return portion T23 to the second slot-inserted portion S2 that is positioned in the second layer of Slot Number 25. The second slot-inserted portion S2 is connected by the second return portion T12 to the first slot-inserted portion S1 that is positioned in the first layer of Slot Number 31. The first slot-inserted portion S1 is connected by the first return portions T1A and T1B to the first slot-inserted portion S1 that is positioned in the first layer of Slot Number 37.

This operation is repeated to connect the slot-inserted portion at Number 125 through to the slot-inserted portion at Number 148 such that the first and second winding bodies 21A and 21B that are inserted into a slot group that includes Slot Numbers {1+6(m−1)} are connected.

A U2-phase coil that makes approximately one lap of the stator core 11 is thereby configured, in which four first and second winding bodies 21A and 21B that are inserted into the slot group at Slot Numbers {1+6(m−1)} and four first and second winding bodies 21A and 21B that are inserted into the slot group at Slot Numbers {2+6(m−1)} are connected in series. The seventh return portion T6B that extends outward from the sixth slot-inserted portion S6 that is positioned in the sixth layer of Slot Number 2 becomes an electric power supplying portion U2in of the U2-phase coil, and the seventh return portion T6B that extends outward from the sixth slot-inserted portion S6 that is positioned in the sixth layer of Slot Number 43 becomes a neutral point U2out.

In this manner, the U1-phase coil and the U2-phase coil are both configured by connecting in series four winding bodies 21 that are inserted into the slot group at Slot Numbers {1+6(m−1)} and four winding bodies 21 that are inserted into the slot group at Slot Numbers {2+6(m−1)}. In other words, the U1-phase coil and the U2-phase coil have identical constructions. The U-phase coil is configured by connecting the U1-phase coil and the U2-phase coil in parallel.

Figure 22:
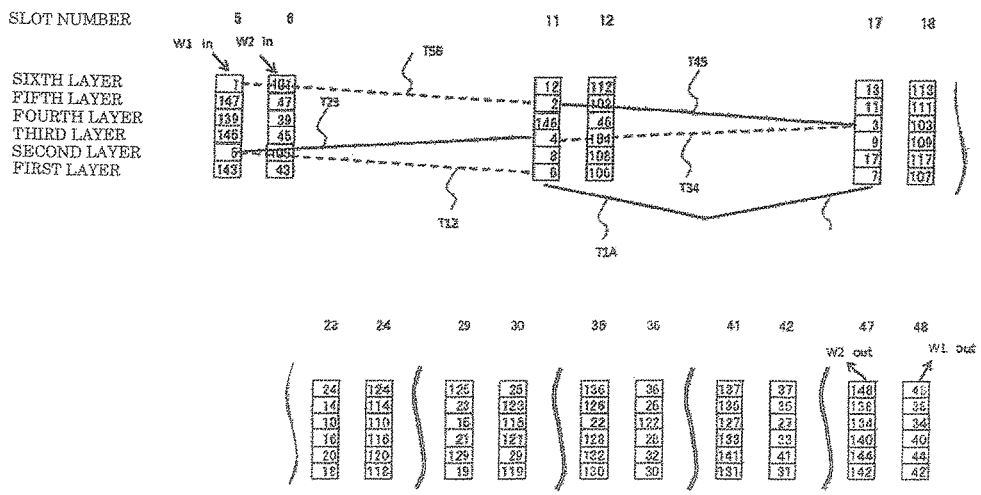
FIG. 22 is a diagram that shows a connection pattern for a W-phase coil in the rotary electric machine according to Embodiment 1 of the present invention.
Figure 23:
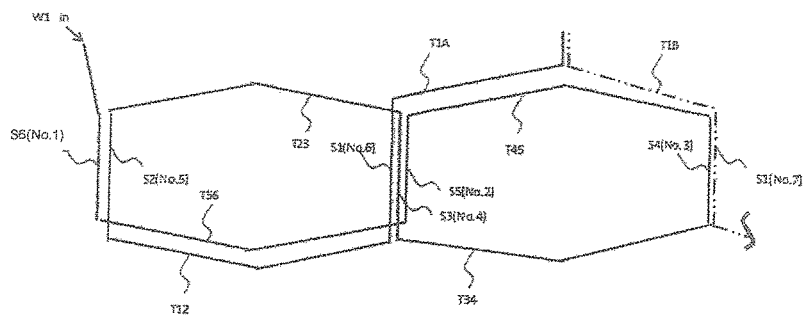
FIG. 23 is a schematic diagram that shows a winding body of the W-phase coil when viewed from radially inside.

Next, a specific connection pattern from the electric power supplying portion Win in the W-phase coil to a neutral point will be explained. FIG. 22 is a diagram that shows a connection pattern for a W-phase coil in the rotary electric machine according to Embodiment 1 of the present invention, and FIG. 23 is a schematic diagram that shows a winding body of the W-phase coil when viewed from radially inside.

In the W1-phase coil, the slot-inserted portion at Number 1 through to the slot-inserted portion at Number 24 are first connected in order such that the first and second winding bodies 21A and 21B that are inserted into a slot group that includes Slot Numbers {5+6(m−1)} are connected in series alternately in pairs. The sixth slot-inserted portion S6 at Number 24 that is positioned in the sixth layer of Slot Number 23 is connected by the seventh return portions T6A and T6B to the sixth slot-inserted portion S6 at Number 25 that is positioned in the sixth layer of Slot Number 30 that is seven slots away. The position at which the sixth slot-inserted portion S6 that is positioned in the sixth layer of Slot Number 23 is connected to the sixth slot-inserted portion S6 that is positioned in the sixth layer of Slot Number 30 that is seven slots away constitutes a modified position 30 of the inserted slot group. Next, the slot-inserted portion at Number 25 through to the slot-inserted portion at Number 48 are connected in order such that the first and second winding bodies 21A and 21B that are inserted into a slot group that includes Slot Numbers {6+6(m−1)} are connected.

A W1-phase coil that makes approximately one lap of the stator core 11 is thereby configured, in which four first and second winding bodies 21A and 21B that are inserted into the slot group at Slot Numbers {5+6(m−1)} and four first and second winding bodies 21A and 21B that are inserted into the slot group at Slot Numbers {6+6(m−1)} are connected in series. The seventh return portion T6B that extends outward from the sixth slot-inserted portion S6 that is positioned in the sixth layer of Slot Number 5 becomes an electric power supplying portion W1in of the W1-phase coil, and the seventh return portion T6B that extends outward from the sixth slot-inserted portion S6 that is positioned in the sixth layer of Slot Number 48 becomes a neutral point W1out.

In the W2-phase coil, the slot-inserted portion at Number 101 through to the slot-inserted portion at Number 124 are first connected in order such that the first and second winding bodies 21A and 21B that are inserted into a slot group that includes Slot Numbers {6+6(m−1)} are connected in series alternately in pairs. The sixth slot-inserted portion S6 at Number 124 that is positioned in the sixth layer of Slot Number 24 is connected by the seventh return portions T6A and T6B to the sixth slot-inserted portion S6 at Number 125 that is positioned in the sixth layer of Slot Number 29 that is five slots away. The position at which the sixth slot-inserted portion S6 that is positioned in the sixth layer of Slot Number 24 is connected to the sixth slot-inserted portion S6 that is positioned in the sixth layer of Slot Number 29 that is five slots away constitutes a modified position 30 of the inserted slot group. Next, the slot-inserted portion at Number 125 through to the slot-inserted portion at Number 148 are connected in order such that the first and second winding bodies 21A and 21B that are inserted into a slot group that includes Slot Numbers {5+6(m−1)} are connected.

A W2-phase coil that makes approximately one lap of the stator core 11 is thereby configured, in which four first and second winding bodies 21A and 21B that are inserted into the slot group at Slot Numbers {5+6(m−1)} and four first and second winding bodies 21A and 21B that are inserted into the slot group at Slot Numbers {6+6(m−1)} are connected in series. The seventh return portion T6B that extends outward from the sixth slot-inserted portion S6 that is positioned in the sixth layer of Slot Number 6 becomes an electric power supplying portion W2in of the W2-phase coil, and the seventh return portion T6B that extends outward from the sixth slot-inserted portion S6 that is positioned in the sixth layer of Slot Number 47 becomes a neutral point W2out.

In this manner, the W1-phase coil and the W2-phase coil are both configured by connecting in series four winding bodies 21 that are inserted into the slot group at Slot Numbers {5+6(m−1)} and four winding bodies 21 that are inserted into the slot group at Slot Numbers {6+6(m−1)}. In other words, the W1-phase coil and the W2-phase coil have identical constructions. The W-phase coil is configured by connecting the W1-phase coil and the W2-phase coil in parallel.

Figure 24:
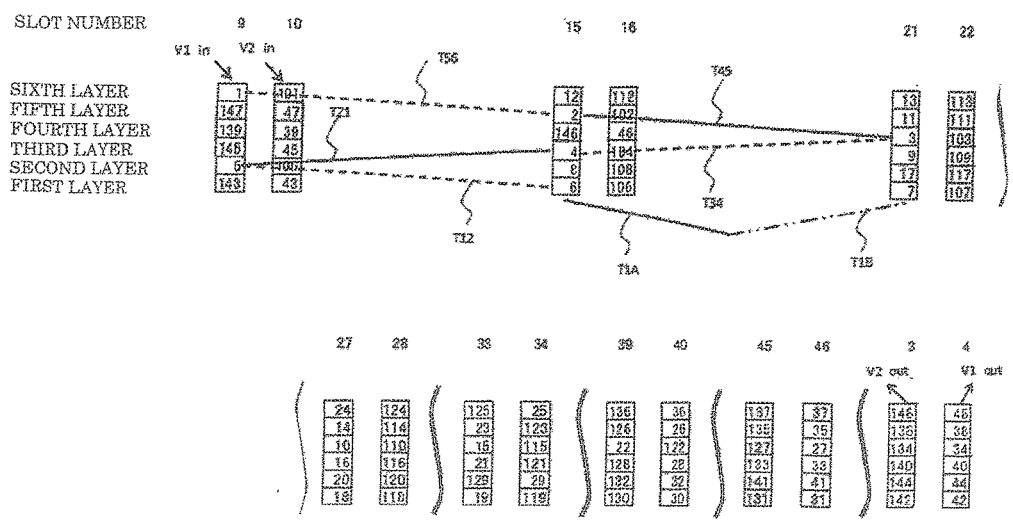
FIG. 24 is a diagram that shows a connection pattern for a V-phase coil in the rotary electric machine according to Embodiment 1 of the present invention.
Figure 25:
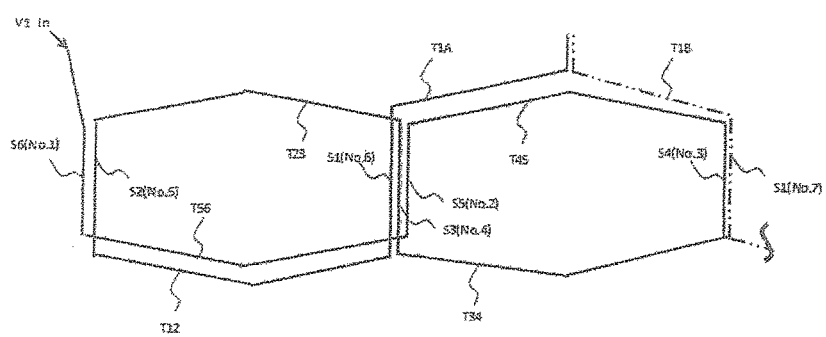
FIG. 25 is a schematic diagram that shows a winding body of the V-phase coil when viewed from radially inside.

Next, a specific connection pattern from the electric power supplying portion Vin in the V-phase coil to a neutral point will be explained. FIG. 24 is a diagram that shows a connection pattern for a V-phase coil in the rotary electric machine according to Embodiment 1 of the present invention, and FIG. 25 is a schematic diagram that shows a winding body of the V-phase coil when viewed from radially inside.

In the V1-phase coil, the slot-inserted portion at Number 1 through to the slot-inserted portion at Number 24 are first connected in order such that the first and second winding bodies 21A and 21B that are inserted into a slot group that includes Slot Numbers {3+6(m−1)} are connected in series alternately in pairs. The sixth slot-inserted portion S6 at Number 24 that is positioned in the sixth layer of Slot Number 27 is connected by the seventh return portions T6A and T6B to the sixth slot-inserted portion S6 at Number 25 that is positioned in the sixth layer of Slot Number 34 that is seven slots away. The position at which the sixth slot-inserted portion S6 that is positioned in the sixth layer of Slot Number 27 is connected to the sixth slot-inserted portion S6 that is positioned in the sixth layer of Slot Number 34 that is seven slots away constitutes a modified position 30 of the inserted slot group. Next, the slot-inserted portion at Number 25 through to the slot-inserted portion at Number 48 are connected in order such that the first and second winding bodies 21A and 21B that are inserted into a slot group that includes Slot Numbers {4+6(m−1)} are connected.

A V1-phase coil that makes approximately one lap of the stator core is thereby configured, in which four first and second winding bodies 21A and 21B that are inserted into the slot group at Slot Numbers {3+6(m−1)} and four first and second winding bodies 21A and 21B that are inserted into the slot group at Slot Numbers {4+6(m−1)} are connected in series. The seventh return portion T6B that extends outward from the sixth slot-inserted portion S6 that is positioned in the sixth layer of Slot Number 9 becomes an electric power supplying portion V1in of the V1-phase coil, and the seventh return portion T6B that extends outward from the sixth slot-inserted portion S6 that is positioned in the sixth layer of Slot Number 4 becomes a neutral point V1out.

In the V2-phase coil, the slot-inserted portion at Number 101 through to the slot-inserted portion at Number 124 are first connected in order such that the first and second winding bodies 21A and 21B that are inserted into a slot group that includes Slot Numbers {4+6(m−1)} are connected in series alternately in pairs. The sixth slot-inserted portion S6 at Number 124 that is positioned in the sixth layer of Slot Number 28 is connected by the seventh return portions T6A and T6B to the sixth slot-inserted portion S6 at Number 125 that is positioned in the sixth layer of Slot Number 33 that is five slots away. The position at which the sixth slot-inserted portion S6 that is positioned in the sixth layer of Slot Number 28 is connected to the sixth slot-inserted portion S6 that is positioned in the sixth layer of Slot Number 33 that is five slots away constitutes a modified position 30 of the inserted slot group. Next, the slot-inserted portion at Number 125 through to the slot-inserted portion at Number 148 are connected in order such that the first and second winding bodies 21A and 21B that are inserted into a slot group that includes Slot Numbers {3+6(m−1)} are connected.

A V2-phase coil that makes approximately one lap of the stator core is thereby configured, in which four first and second winding bodies 21A and 21B that are inserted into the slot group at Slot Numbers {3+6(m−1)} and four first and second winding bodies 21A and 21B that are inserted into the slot group at Slot Numbers {4+6(m−1)} are connected in series. The seventh return portion T6B that extends outward from the sixth slot-inserted portion S6 that is positioned in the sixth layer of Slot Number 10 becomes an electric power supplying portion V2in of the V2-phase coil, and the seventh return portion T6B that extends outward from the sixth slot-inserted portion S6 that is positioned in the sixth layer of Slot Number 3 becomes a neutral point V2out.

In this manner, the V1-phase coil and the V2-phase coil are both configured by connecting in series four winding bodies 21 that are inserted into the slot group at Slot Numbers {3+6(m−1)} and four winding bodies 21 that are inserted into the slot group at Slot Numbers {4+6(m−1)}. In other words, the V1-phase coil and the V2-phase coil have identical constructions. The V-phase coil is configured by connecting the V1-phase coil and the V2-phase coil in parallel.

The stator winding 20 that is shown in FIG. 19 is configured by connecting the neutral points of the U-phase coil, the V-phase coil, and the W-phase coil that are configured in this manner. In this stator winding 20, because the U1-phase coil and the U2-phase coil that are connected in parallel have identical constructions, and the V1-phase coil and the V2-phase coil that are connected in parallel have identical constructions, and the W1-phase coil and the W2-phase coil that are connected in parallel have identical constructions, generation of cyclic currents is suppressed.

Figures 26, 27:
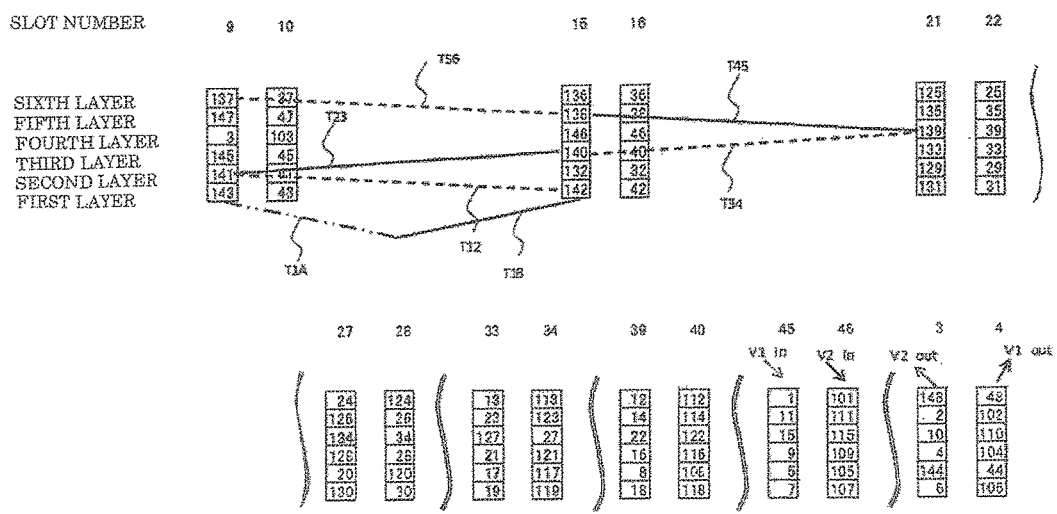
FIG. 26 is a diagram that shows a connection pattern for a V-phase coil in a comparative stator winding.
FIG. 27 is a schematic diagram that shows a winding body of the V-phase coil in the comparative stator winding when viewed from radially inside.
Figure 28:
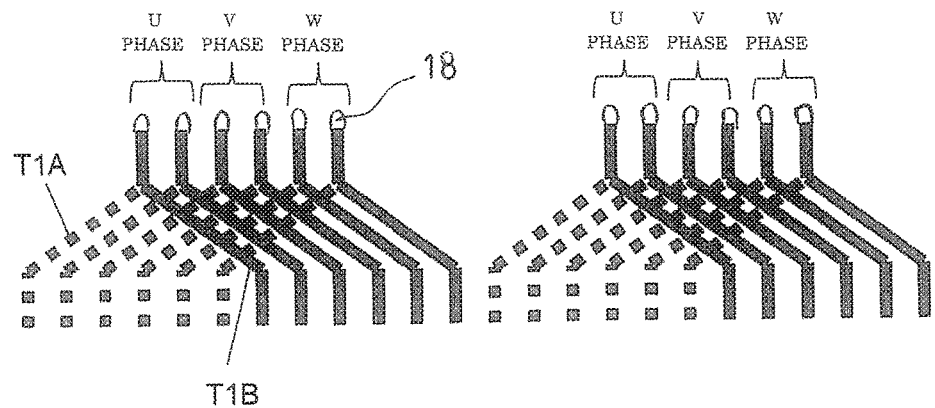
FIG. 28 is a schematic diagram that explains an arranged state of first return portions of the comparative stator winding.

Next, effects according to Embodiment 1 that result from arranging the first return portions T1A and T1B circumferentially such that directions of inclination of the oblique portions thereof are oriented in opposite directions alternately in pairs will be explained in contrast to a comparative example. FIG. 26 is a diagram that shows a connection pattern for a V-phase coil in a comparative stator winding, FIG. 27 is a schematic diagram that shows a winding body of the V-phase coil in the comparative stator winding when viewed from radially inside, and FIG. 28 is a schematic diagram that explains an arranged state of first return portions of the comparative stator winding.

First, connections in a comparative V1-phase coil will be explained with reference to FIGS. 26 and 27.

The V1-phase coil is configured by connecting first and second winding bodies 21A and 21B that are inserted into slots that includes Slot Numbers {3+6(m−1)} and Slot Numbers {4+6(m−1)}.

First, the sixth slot-inserted portion S6 that is positioned in the sixth layer of Slot Number 45 is connected by the sixth return portion T56 to the fifth slot-inserted portion S5 that is positioned in the fifth layer of Slot Number 3. The fifth slot-inserted portion S5 is connected by the fifth return portion T45 to the fourth slot-inserted portion S4 that is positioned in the fourth layer of Slot Number 9. The fourth slot-inserted portion S4 is connected by the fourth return portion T34 to the third slot-inserted portion S3 that is positioned in the third layer of Slot Number 3. The third slot-inserted portion S3 is connected by the third return portion T23 to the second slot-inserted portion S2 that is positioned in the second layer of Slot Number 45. The second slot-inserted portion S2 is connected by the second return portion T12 to the first slot-inserted portion S1 that is positioned in the first layer of Slot Number 3. The first slot-inserted portion S1 is connected by the first return portions T1A and T1B to the first slot-inserted portion S1 that is positioned in the first layer of Slot Number 45.

This operation is repeated to connect the slot-inserted portion at Number 1 through to the slot-inserted portion at Number 24 such that the first and second winding bodies 21A and 21B that are inserted into a slot group that includes Slot Numbers {3+6(m−1)} are connected in series alternately in pairs.

Next, the sixth slot-inserted portion S6 that is positioned in the sixth layer of Slot Number 27 is connected by the seventh return portions T6A and T6B to the sixth slot-inserted portion S6 that is positioned in the sixth layer of Slot Number 22 that is five slots away. The sixth slot-inserted portion S6 is connected by the sixth return portion T56 to the fifth slot-inserted portion S5 that is positioned in the fifth layer of Slot Number 28. The fifth slot-inserted portion S5 is connected by the fifth return portion T45 to the fourth slot-inserted portion S4 that is positioned in the fourth layer of Slot Number 34. The fourth slot-inserted portion S4 is connected by the fourth return portion T34 to the third slot-inserted portion S3 that is positioned in the third layer of Slot Number 28. The third slot-inserted portion S3 is connected by the third return portion T23 to the second slot-inserted portion S2 that is positioned in the second layer of Slot Number 22. The second slot-inserted portion S2 is connected by the second return portion T12 to the first slot-inserted portion S1 that is positioned in the first layer of Slot Number 28. The first slot-inserted portion S1 is connected by the first return portions T1A and T1B to the first slot-inserted portion S1 that is positioned in the first layer of Slot Number 22.

This operation is repeated to connect the slot-inserted portion at Number 25 through to the slot-inserted portion at Number 48 in order such that the first and second winding bodies 21A and 21B that are inserted into a slot group that includes Slot Numbers {4+6(m−1)} are connected.

A V1-phase coil is thereby configured, in which four winding bodies 21 that are inserted into the slot group at Slot Numbers {3+6(m−1)} and four winding bodies 21 that are inserted into the slot group at Slot Numbers {4+6(m−1)} are connected in series. The seventh return portion T6B that extends outward from the sixth slot-inserted portion S6 that is positioned in the sixth layer of Slot Number 45 becomes an electric power supplying portion V1in of the V1-phase coil, and the seventh return portion T6B that extends outward from the sixth slot-inserted portion S6 that is positioned in the sixth layer of Slot Number 4 becomes a neutral point V1out.

A V2-phase coil is configured by connecting first and second winding bodies 21A and 21B that are inserted into slots that includes Slot Numbers {3+6(m−1)} and Slot Numbers {4+6(m−1)}.

First, the sixth slot-inserted portion S6 that is positioned in the sixth layer of Slot Number 46 is connected by the sixth return portion T56 to the fifth slot-inserted portion S5 that is positioned in the fifth layer of Slot Number 4. The fifth slot-inserted portion S5 is connected by the fifth return portion T45 to the fourth slot-inserted portion S4 that is positioned in the fourth layer of Slot Number 10. The fourth slot-inserted portion S4 is connected by the fourth return portion T34 to the third slot-inserted portion S3 that is positioned in the third layer of Slot Number 4. The third slot-inserted portion S3 is connected by the third return portion T23 to the second slot-inserted portion S2 that is positioned in the second layer of Slot Number 46. The second slot-inserted portion S2 is connected by the second return portion T12 to the first slot-inserted portion S1 that is positioned in the first layer of Slot Number 4. The first slot-inserted portion S1 is connected by the first return portions T1A and T1B to the first slot-inserted portion S1 that is positioned in the first layer of Slot Number 46.

This operation is repeated to connect the slot-inserted portion at Number 101 through to the slot-inserted portion at Number 124 in order such that the first and second winding bodies 21A and 21B that are inserted into a slot group that includes Slot Numbers {4+6(m−1)} are connected.

Next, the sixth slot-inserted portion S6 that is positioned in the sixth layer of Slot Number 28 is connected by the seventh return portions T6A and T6B to the sixth slot-inserted portion S6 that is positioned in the sixth layer of Slot Number 21 that is seven slots away. The sixth slot-inserted portion S6 is connected by the sixth return portion T56 to the fifth slot-inserted portion S5 that is positioned in the fifth layer of Slot Number 27. The fifth slot-inserted portion S5 is connected by the fifth return portion T45 to the fourth slot-inserted portion S4 that is positioned in the fourth layer of Slot Number 33. The fourth slot-inserted portion S4 is connected by the fourth return portion T34 to the third slot-inserted portion S3 that is positioned in the third layer of Slot Number 27. The third slot-inserted portion S3 is connected by the third return portion T23 to the second slot-inserted portion S2 that is positioned in the second layer of Slot Number 21. The second slot-inserted portion S2 is connected by the second return portion T12 to the first slot-inserted portion S1 that is positioned in the first layer of Slot Number 27. The first slot-inserted portion S1 is connected by the first return portions T1A and T1B to the first slot-inserted portion S1 that is positioned in the first layer of Slot Number 21.

This operation is repeated to connect the slot-inserted portion at Number 125 through to the slot-inserted portion at Number 148 in order such that the first and second winding bodies 21A and 21B that are inserted into a slot group that includes Slot Numbers {3+6(m−1)} are connected.

A V2-phase coil is thereby configured, in which four winding bodies 21 that are inserted into the slot group at Slot Numbers {3+6(m−1)} and four winding bodies 21 that are inserted into the slot group at Slot Numbers {4+6(m−1)} are connected in series. The seventh return portion T6B that extends outward from the sixth slot-inserted portion S6 that is positioned in the sixth layer of Slot Number 46 becomes an electric power supplying portion V2in of the V2-phase coil, and the seventh return portion T6B that extends outward from the sixth slot-inserted portion S6 that is positioned in the sixth layer of Slot Number 3 becomes a neutral point V2out.

The V-phase coil, in which the V1-phase coil and the V2-phase coil are connected in parallel, is formed by connecting the seventh return portions T6B that extend outward from the sixth slot-inserted portions S6 that are positioned in the sixth layer of Slot Numbers 45 and 46, and connecting the seventh return portions T6B that extend outward from the sixth slot-inserted portions S6 that are positioned in the sixth layer of the Slot Numbers 3 and 4.

Moreover, a comparative U-phase coil and W-phase coil are connected in a similar or identical manner to Embodiment 1. In other words, in the comparative example, first and second winding bodies 21A and 21B are connected from Slot Number 1 toward Slot Number 48 in the U-phase coil and the W-phase coil, and first and second winding bodies 21A and 21B are connected Slot Number 48 toward Slot Number 1 in the V-phase coil. Thus, directions of inclination of the first return portions T1A and T1B and the seventh return portions T6A and T6B of the first and second winding bodies 21A and 21B that constitute the V-phase coil are oriented in opposite directions to the directions of inclination of the first return portions T1A and T1B and the seventh return portions T6A and T6B of the first and second winding bodies 21A and 21B that constitute the U-phase coil and the W-phase coil.

In the comparative stator winding that is configured in this manner, as shown in FIG. 28, first return portions T1A and first return portions T1B are arranged alternately in groups of six. Thus, the directions of inclination of the oblique portions of the first return portions T1A and T1B are arranged so as to be oriented in opposite directions alternately in groups of six. Sets of six joint portions 18 between the end portions of the first return portions T1A and T1B that are arranged at a spacing of one slot are arranged circumferentially at a spacing of twelve slots. Moreover, sets of six joint portions 18 between the end portions of the seventh return portions T6A and T6B that are arranged at a spacing of twelve slots are arranged circumferentially at a spacing of twelve slots.

In Embodiment 1, pairs of first winding bodies 21A and second winding bodies 21B are mounted to the stator core 11 so as to alternate circumferentially. As shown in FIG. 14, first return portions T1A and first return portions T1B are thereby arranged alternately in pairs. Thus, the directions of inclination of the oblique portions of the first return portions T1A and T1B are arranged so as to be oriented in opposite directions alternately in pairs. Pairs of joint portions 18 between the end portions of the first return portions T1A and T1B that are arranged at a spacing of one slot are arranged circumferentially at a spacing of four slots. Moreover, as shown in FIG. 16, pairs of joint portions 18 between the end portions of the seventh return portions T6A and T6B that are arranged at a spacing of one slot are also arranged circumferentially at a spacing of four slots.

In Embodiment 1, because the number of joint portions 18 that are arranged so as to be adjacent in a circumferential direction is reduced in this manner, space for chucking the first return portions T1A and T1B and the seventh return portions T6A and T6B during joining can be ensured, increasing productivity, and also improving electrical insulation. Because the first return portions T1A and T1B that are arranged on a radially inner side of the coil ends are joined together, and the seventh return portions T6A and T6B that are arranged on a radially outer side of the coil ends are joined together, increases in axial dimensions of the stator winding 20, i.e., increases in axial length are suppressed. In addition, because circumferentially adjacent same-phase return portions in the first return portions T1A and T1B and the seventh return portions T6A and T6B are bent in identical directions, and different-phase return portions are bent in opposite directions, distances between interphase conductor wires 19 are lengthened, enabling insulating coatings on the conductor wires 19 to be made thinner, and also enabling increased output to be achieved.

Moreover, in the winding bodies 21 according to Embodiment 1 above, radial positions of the sixth through first slot-inserted portions S6 through S1 inside the slots are displaced sequentially by a single layer from a radially outer side to a radially inner side, and directions from Qth slot-inserted portions toward (Q−1)th slot-inserted portions of the return portions that connect the Qth slot-inserted portions and the (Q−1)th slot-inserted portions are "right, right, left, left, right" in FIG. 17. However, the directions from the Qth slot-inserted portions toward the (Q−1)th slot-inserted portions of the return portions that connect the Qth slot-inserted portions and the (Q−1)th slot-inserted portions are arbitrary provided that the radial positions of the sixth through first slot-inserted portions S6 through S1 inside the slots are displaced sequentially by a single layer from a radially outer side to a radially inner side. The directions from the Qth slot-inserted portions toward the (Q−1)th slot-inserted portions of the return portions that connect the Qth slot-inserted portions and the (Q−1)th slot-inserted portions may be "right, left, right, left, right", or "right, right, right, right, right", for example.

Embodiment 2

Figure 29:
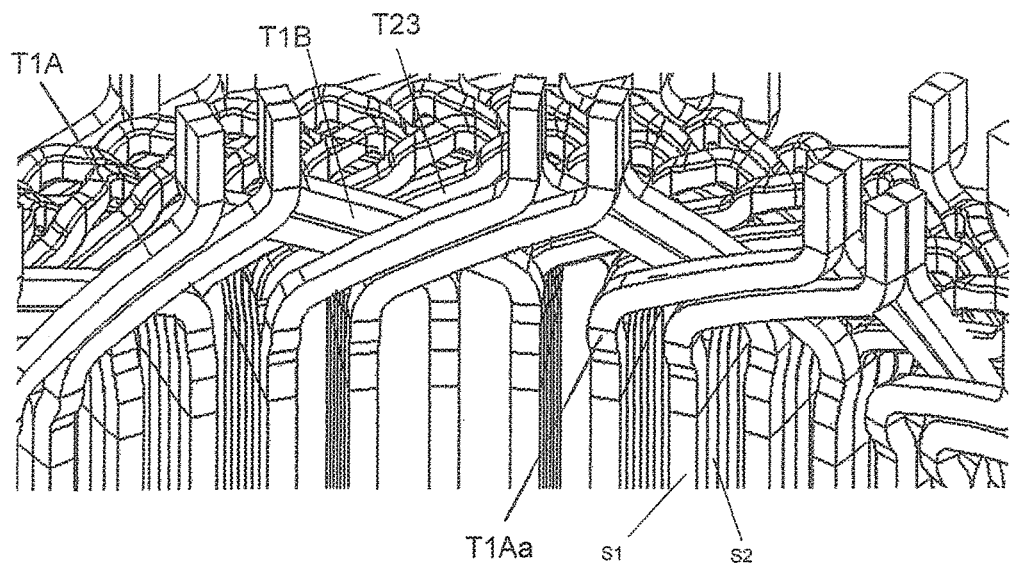
FIG. 29 is a partial oblique projection that shows a stator in a rotary electric machine according to Embodiment 2 of the present invention when viewed from a radially inner side.
Figure 30:
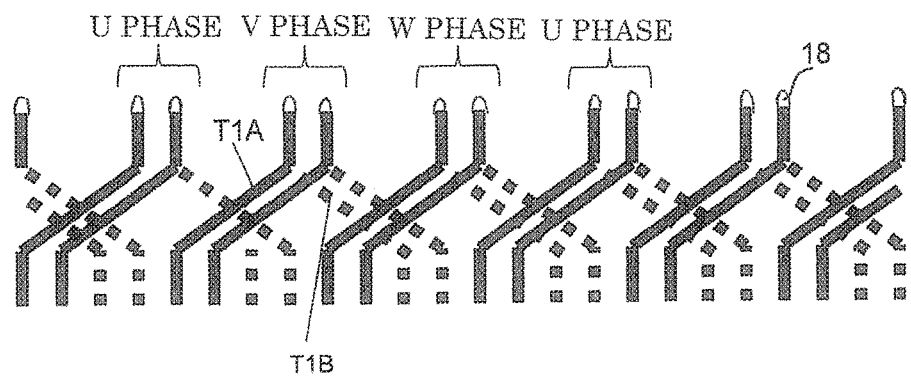
FIG. 30 is a schematic diagram that explains an arranged state of first return portions of a stator winding in the rotary electric machine according to Embodiment 2 of the present invention.
Figure 31:
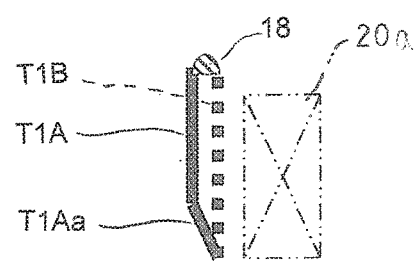
FIG. 31 is a schematic diagram that explains the arranged state of the first return portions of the stator winding in the rotary electric machine according to Embodiment 2 of the present invention.
Figure 32:
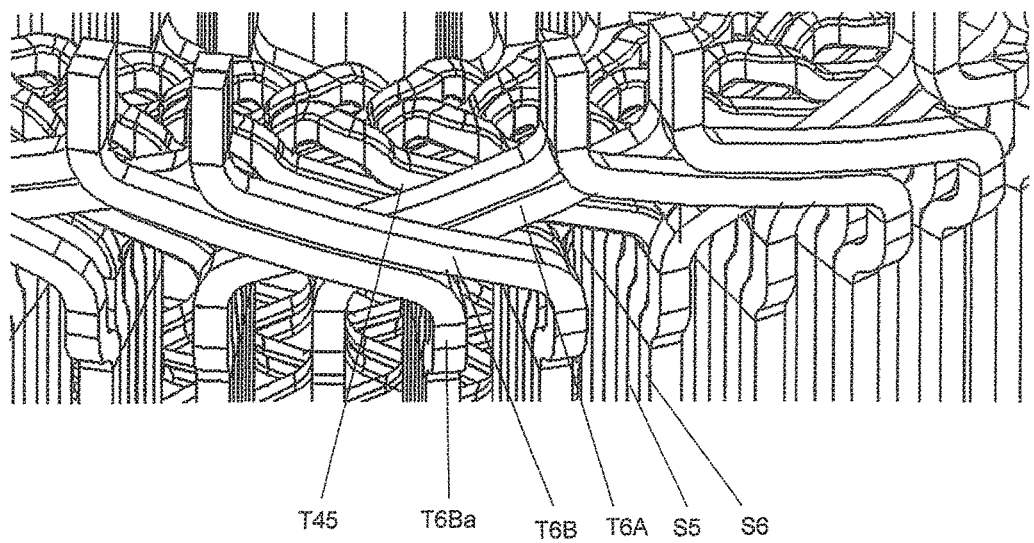
FIG. 32 is a partial oblique projection that shows the stator in the rotary electric machine according to Embodiment 2 of the present invention when viewed from a radially outer side.

FIG. 29 is a partial oblique projection that shows a stator in a rotary electric machine according to Embodiment 2 of the present invention when viewed from a radially inner side, FIGS. 30 and 31 are schematic diagrams that explain an arranged state of first return portions of a stator winding in the rotary electric machine according to Embodiment 2 of the present invention, and FIG. 32 is a partial oblique projection that shows the stator in the rotary electric machine according to Embodiment 2 of the present invention when viewed from a radially outer side.

As shown in FIGS. 29 through 31, crank portions T1Aa are formed on root portions of first return portions T1A of first winding bodies 21A on a radially inner side of first coil ends 20a, and displace inclined portions of the first return portions T1A radially inward relative to first return portions T1B of second winding bodies 21B by an amount equal to a radial thickness of a conductor wire 19.

As shown in FIG. 32, crank portions T6Ba are formed on root portions of seventh return portions T6B of the second winding bodies 21B on a radially outer side of the first coil ends 20a, and displace inclined portions of the seventh return portions T6B radially outward relative to seventh return portions T6A of the first winding bodies 21A by an amount equal to the radial thickness of the conductor wire 19.

Moreover, a remainder of the configuration is configured in a similar or identical manner to that of Embodiment 1 above.

In Embodiment 2, inclined portions of first return portions T1A of first winding bodies 21A are displaced radially inward relative to inclined portions of first return portions T1B of second winding bodies 21B by an amount equal to the radial thickness of a conductor wire 19. Because third return portions T23 that are radially adjacent to the first return portions T1B are bent in opposite circumferential directions to the first return portions T1B, radially outward bulging of the root portions of the first return portions T1B does not interfere with the third return portions T23. Because of that, radial distances between the first slot-inserted portions S1 and the second slot-inserted portions S2 can be reduced, increasing coil space factor, and enabling increased output to be achieved.

Crank portions T6Ba are formed on root portions of seventh return portions T6B of the second winding bodies 21B such that inclined portions of the seventh return portions T6B of the second winding bodies 21B are displaced radially outward relative to inclined portions of seventh return portions T6A of the first winding bodies 21A by an amount equal to the radial thickness of the conductor wire 19. Because fifth return portions T45 that are radially adjacent to the seventh return portions T6A are bent in opposite circumferential directions to the seventh return portions T6A, radially inward bulging of the root portions of the seventh return portions T6A does not interfere with the fifth return portions T45. Because of that, radial distances between the fifth slot-inserted portions S5 and the sixth slot-inserted portions S6 can be reduced, increasing coil space factor, and enabling increased output to be achieved.

In Embodiment 2, as shown in FIGS. 26 and 27, pairs of first return portions T1A and first return portions T1B are arranged so as to alternate. Thus, the directions of inclination of the oblique portions of the first return portions T1A and T1B are arranged so as to be oriented in opposite directions alternately in pairs. Pairs of joint portions 18 between the end portions of the first return portions T1A and T1B that are arranged at a spacing of one slot are arranged circumferentially at a spacing of four slots. As shown in FIG. 29, seventh return portions T6A and seventh return portions T6B are thereby arranged alternately in pairs. Thus, pairs of joint portions 18 between the end portions of the seventh return portions T6A and T6B that are arranged at a spacing of one slot are also arranged circumferentially at a spacing of four slots.

Consequently, similar or identical effects to those in Embodiment 1 above can also be achieved in Embodiment 2.

Moreover, in each of the above embodiments, three-phase rotary electric machines in which the number of slots per phase per pole is two have been explained, but the present invention may be applied to three-phase rotary electric machines in which the number of slots per phase per pole is greater than two. If the number of slots per phase per pole is three, for example, the directions of inclination of the oblique portions of the first return portions are arranged so as to be oriented in opposite directions alternately in groups of three. That is, if the number of slots per phase per pole is n, then the directions of inclination of the oblique portions of the first return portions and the seventh return portions are arranged so as to be oriented in opposite directions alternately in groups of n. Then, sets of n joint portions between end portions of the first return portions and the seventh return portions that are arranged at a spacing of one slot are arranged circumferentially so as to have a predetermined spacing. Furthermore, at modified positions of the inserted slot group, seventh return portions that extend outward from slots that are (3n−1) slots apart will be connected to each other, and seventh return portions that extend outward from slots that are (3n+1) slots apart will be connected to each other. In regions other than the modified positions of the inserted slot group, seventh return portions that extend outward from slots that are 3n slots apart will be connected to each other.

In each of the above embodiments, in the modified positions of the inserted slot group, seventh return portions that extend outward from slots that are seven slots apart are connected to each other using crossover wires, but the seventh return portions that extend outward from slots that are seven slots apart may be connected to each other directly.

In each of the above embodiments, electric power supplying portions and neutral points of respective phase windings are configured using seventh return portions that constitute second terminals, but the electric power supplying portions and neutral points of the respective phase windings may be configured using first return portions that constitute first terminals.

In each of the above embodiments, an eight-pole forty-eight-slot rotary electric machine has been explained, but the number of poles and the number of slots are not limited thereto.

In each of the above embodiments, a stator winding is constituted by wye-connecting a U-phase coil, a V-phase coil, and a W-phase coil, but a stator winding may be configured by delta-connecting a U-phase coil, a V-phase coil, and a W-phase coil.

In each of the above embodiments, winding bodies are configured using single continuous conductor wires, but winding bodies may be configured by connecting a plurality of conductors by welding, etc., provided that they are configured into distributed windings.

What is claimed is:

1. A rotary electric machine that is driven by a three-phase alternating-current, said rotary electric machine comprising:
 an annular stator core in which slots are formed at a ratio of n slots per phase per pole, where n is an integer that is greater than or equal to 2; and
 a stator that comprises a stator winding that is mounted to said stator core,
 wherein:
 said stator winding comprises a plurality of distributed-winding coils that are each constituted by a conductor;
 each of said plurality of coils comprises:
 2x slot-inserted portions that are inserted into said slots, where x is a natural number that is greater than or equal to 1;
 (2x−1) return portions that link said 2x slot-inserted portions consecutively by alternately connecting first end portions and second end portions in an axial direction of said stator core;
 a first terminal that extends outward from a slot-inserted portion that is positioned at a first end of said consecutive slot-inserted portions; and
 a second terminal that extends outward from a slot-inserted portion that is positioned at a second end of said consecutive slot-inserted portions;
 first terminals that constitute phase windings of said stator winding among said first terminals extend outward individually from a radially innermost position of each of said slots such that a direction of bending in a circumferential direction after extending outward from said slots is changed alternately in groups of n;
 second terminals that constitute phase windings of said stator winding among said second terminals extend outward individually from a radially outermost position of each of said slots such that a direction of bending in a circumferential direction after extending outward from said slots is changed alternately in groups of n; and said phase windings are configured in a first group of a group of said first terminals and a group of said second terminals by connecting together tip portions of terminals that are bent so as to extend outward from slots that are 3n slots apart and approach each other, and in a second group of said group of first terminals and said group of second terminals by connecting together tip portions of terminals that are bent so as to extend outward from slots that are (3n+1) slots apart and approach each other and also connecting together tip portions of terminals that are bent so as to extend outward from slots are (3n−1) slots apart and approach each other in modified positions of an inserted slot group, and by connecting together tip portions of terminals that are bent so as to extend outward from slots that are 3n slots apart and approach each other in regions other than said modified positions of said inserted slot group.

2. The rotary electric machine according to claim 1, wherein:

among said first terminals, first terminals that are bent in a similar or identical direction to return portions that are radially adjacent to said first terminals are displaced radially inward relative to first terminals that are bent in an opposite direction to return portions that are radially adjacent to said first terminals; and among said second terminals, second terminals that are bent in a similar or identical direction to return portions that are radially adjacent to said second terminals are displaced radially outward relative to second terminals that are bent in an opposite direction to return portions that are radially adjacent to said second terminals.

3. The rotary electric machine according to claim 1, wherein:

said conductors are jointless continuous conductor wires that are covered in insulation; and said coils are mounted to said stator core at a pitch of one slot so as to be equal in number to said slots.

4. The rotary electric machine according to claim 3, wherein:

among said first terminals, first terminals that are bent in a similar or identical direction to return portions that are radially adjacent to said first terminals are displaced radially inward relative to first terminals that are bent in an opposite direction to return portions that are radially adjacent to said first terminals; and among said second terminals, second terminals that are bent in a similar or identical direction to return portions that are radially adjacent to said second terminals are displaced radially outward relative to second terminals that are bent in an opposite direction to return portions that are radially adjacent to said second terminals.

5. The rotary electric machine according to claim 3, wherein each of said phase windings is configured by connecting said coils that are mounted to said stator core in order of arrangement in an identical circumferential direction.

6. The rotary electric machine according to claim 5, wherein:

among said first terminals, first terminals that are bent in a similar or identical direction to return portions that are radially adjacent to said first terminals are displaced radially inward relative to first terminals that are bent in an opposite direction to return portions that are radially adjacent to said first terminals; and among said second terminals, second terminals that are bent in a similar or identical direction to return portions that are radially adjacent to said second terminals are displaced radially outward relative to second terminals that are bent in an opposite direction to return portions that are radially adjacent to said second terminals.

* * * * *